United States Patent
Park et al.

(10) Patent No.: US 8,363,532 B2
(45) Date of Patent: Jan. 29, 2013

(54) METHOD AND APPARATUS FOR CONTROLLING POSITION IN WHICH DATA IS TO BE RECORDED

(75) Inventors: Young-jae Park, Yongin-si (KR); Jae-cheol Bae, Suwon-si (KR); In-Joo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 12/571,752

(22) Filed: Oct. 1, 2009

(65) Prior Publication Data

US 2010/0110846 A1   May 6, 2010

(30) Foreign Application Priority Data

Oct. 31, 2008  (KR) .................. 10-2008-0107964

(51) Int. Cl.
*G11B 7/00* (2006.01)
(52) U.S. Cl. .............. 369/103; 369/112.1; 369/112.15; 369/53.28; 369/44.28; 369/44.29; 369/44.35
(58) Field of Classification Search .................. None
See application file for complete search history.

(56) References Cited

U.S. PATENT DOCUMENTS

| | | | | |
|---|---|---|---|---|
| 7,859,955 B2* | 12/2010 | Bae et al. | ................. | 369/44.41 |
| 2008/0239922 A1 | 10/2008 | Fujita et al. | | |
| 2008/0239924 A1* | 10/2008 | Fujita et al. | ................. | 369/112.1 |
| 2008/0298212 A1* | 12/2008 | Tazaki et al. | ............ | 369/112.23 |
| 2009/0097376 A1* | 4/2009 | Yamaoka et al. | ............... | 369/94 |
| 2009/0168629 A1 | 7/2009 | Bae et al. | | |
| 2010/0008204 A1* | 1/2010 | Bae et al. | .................. | 369/103 |
| 2010/0046338 A1 | 2/2010 | Saito et al. | | |
| 2010/0061203 A1* | 3/2010 | Kim et al. | .................. | 369/44.23 |
| 2010/0061210 A1* | 3/2010 | Kim et al. | ........................ | 369/94 |

FOREIGN PATENT DOCUMENTS

| | | |
|---|---|---|
| EP | 1 411 508 A2 | 4/2004 |
| EP | 2 159 794 A1 | 3/2010 |
| JP | 2008-071433 A | 3/2008 |
| JP | 2008-097753 A | 4/2008 |
| KR | 10-2009-0072449 A | 7/2009 |

OTHER PUBLICATIONS

Extended European Search Report (including European Search Opinion) issued on Aug. 10, 2011, in counterpart European Patent Application No. 09174599.2, (*6 pages, in English*).

(Continued)

*Primary Examiner* — Joseph Haley
*Assistant Examiner* — Ifedayo Iluyomade
(74) *Attorney, Agent, or Firm* — NSIP Law

(57) ABSTRACT

A method and apparatus to control a position in which data is to be recorded on a holographic data recording medium by using interference between a reference light and a signal light, the method including: irradiating the reference light and the signal light on the holographic data recording medium; generating a focus error signal that indicates a distance difference between a first focus corresponding to a focus of the reference light on the holographic data recording medium and a second focus corresponding to a focus of the signal light on the holographic data recording medium, based on information about a reflective signal light generated when the irradiated signal light is reflected from a reflective transmission layer of the holographic data recording medium; and moving the second focus to a position of the first focus, based on the focus error signal.

25 Claims, 19 Drawing Sheets

OTHER PUBLICATIONS

Horigome, Toshihiro, et al., "Drive System for Micro-Reflector Recording Employing Blue Laser Diode," Int. Symp. on Opt. Memories, Oct. 2006, paper Mo-D-02, Takamatsu, Japan, (*2 pages, in English*).

Orlic, Susanna, et al., "High Density Multilayer Recording of Microgratings for Optical Data Storage,"Proceedings of SPIE, 2004, pp. 161-173, vol. 5521, SPIE, Bellingham, WA, (*13 pages, in English*).

\* cited by examiner

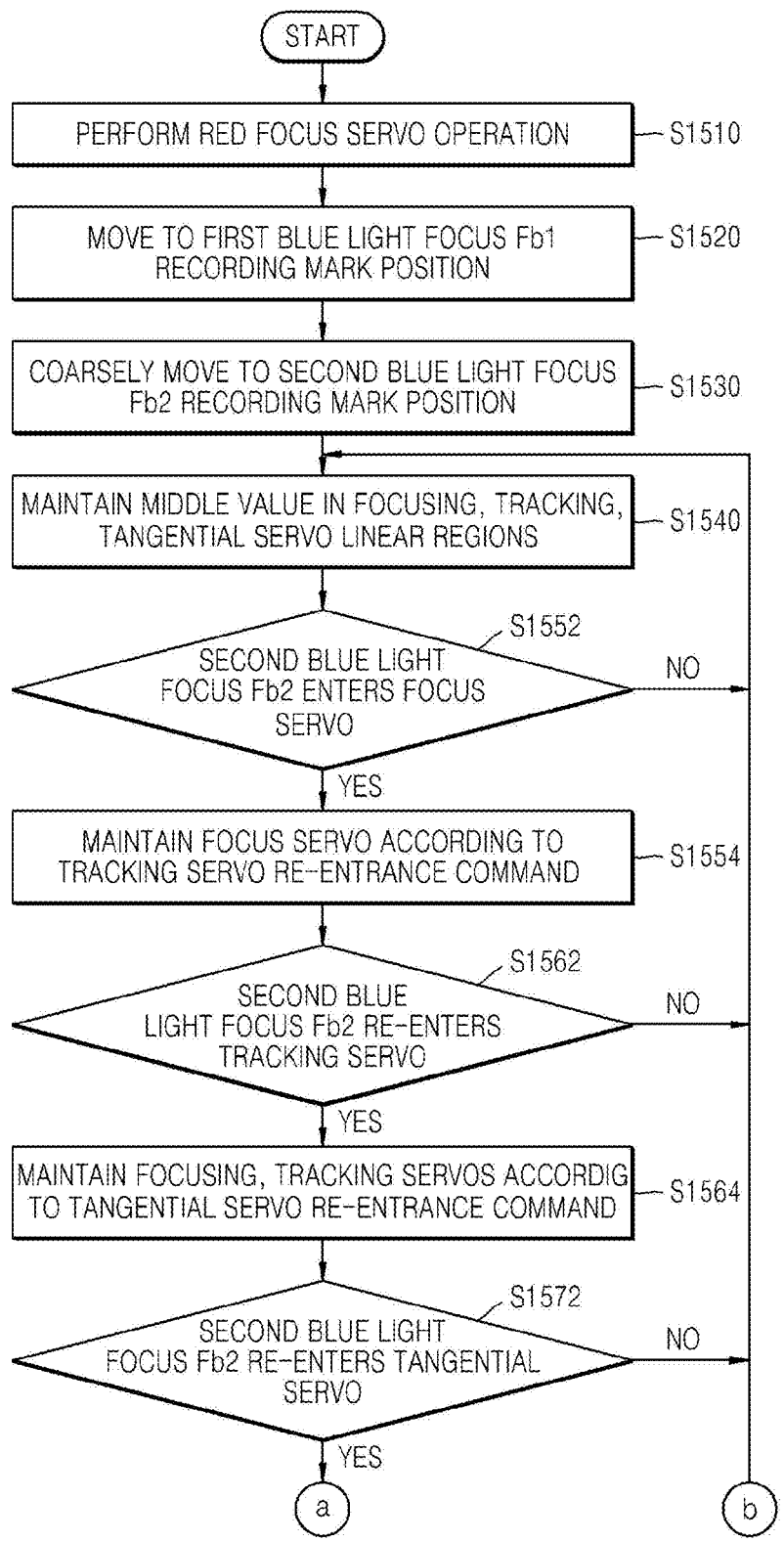

METHOD AND APPARATUS FOR CONTROLLING POSITION IN WHICH DATA IS TO BE RECORDED

CROSS-REFERENCE TO RELATED APPLICATION

This application claims the benefit of Korean Patent Application No. 10-2008-0107964, filed on Oct. 31, 2008 in the Korean Intellectual Property Office, the disclosure of which is incorporated herein in its entirety by reference.

BACKGROUND OF THE INVENTION

1. Field of the Invention

Aspects of the present invention relate to a method and apparatus to control a position in which data is to be recorded, and more particularly, a method and apparatus to control a position in which data to be recorded on a holographic data recording medium.

2. Description of the Related Art

Technology for storing information by using holograms has become widely used. In such technology, information is stored in an optical interference pattern on an inorganic crystal that is photosensitive or on a photosensitive material such as a photo polymer. Optical interference patterns are formed by using two coherent laser beams. In other words, interference patterns are formed when a reference light and a signal light having different paths interfere with each other, cause chemical or physical changes in a photosensitive information storage medium, and are recorded thereon. During reproduction, a reference light that is similar to the reference light used to record information is irradiated on the interference patterns recorded on the information storage medium so as to reproduce information from the recorded interference patterns. This causes diffraction due to the interference patterns and, as such, the signal light is restored and information is reproduced.

Examples of technology to store information by using holograms include a volume holography method by which information is recorded and/or reproduced in one page units by using volume holography, and a micro-holography method by which information is recorded and/or reproduced in single bit units by using micro-holography. In the volume holography method, a large amount of information can be processed simultaneously. However, since an optical system should be very precisely adjusted, it is not easy to adopt the method in an apparatus to store information for general consumers.

In the micro-holography method, two condensed light beams interfere with each other at a particular point of focus and thus form fine interference patterns (micro-holograms) on a plane of an information storage medium. A plurality of such interference patterns are recorded on the information storage medium to form a plurality of recording layers. The recording layers are superimposed in a depth direction of the information storage medium to form a multi-layer structure so that information can be recorded three-dimensionally on the information storage medium.

Basically, in the micro-holography method, information is recorded in a plurality of recording layers in the depth direction of the information storage medium, thereby increasing a recording capacity of the information storage medium. In a multi-layer optical disk, such as a Blu-ray disk (BD), a reflective layer exists in each of the recording layers. The plurality of recording layers are distinguished according to the intensity of a signal of reflected light and the polarity of the signal, and an optical focus is formed in a desired recording layer.

However, unlike in a conventional optical disk, in the information storage medium used in the micro-holography method, a reflective layer does not exist in each of the recording layers. Specifically, when a reflective layer exists in each of the recording layers of the information storage medium, efficiency of recorded light is degraded due to the reflective layer. Thus, information cannot be recorded in a plurality of layers in the depth direction of the information storage medium, and a recording capacity may not be increased.

Thus, in the information storage medium used in the micro-holography method, a reflective layer does not exist in each of the recording layers. As such, it is not easy to form an optical focus in a desired recording layer of the information storage medium. When an optical focus is not formed on the desired recording layer, a distance between the recording layers may not be uniform. As a result, there may be a change in crosstalk between adjacent layers, and the performance of a reproduction signal in each of the recording layers may be different. Furthermore, the optical focus may be formed in a portion that is far away from the recording layers, and recording may not be appropriately performed even when recording starts.

SUMMARY OF THE INVENTION

Aspects of the present invention provide a method and apparatus to control a position in which data is to be recorded on a holographic data recording medium According to an aspect of the present invention, there is provided a method of controlling a position in which data is to be recorded on a holographic data recording medium by using interference between a reference light and a signal light, the method including: irradiating the reference light and the signal light on the holographic data recording medium; generating a focus error signal that indicates a distance difference between a first focus corresponding to a focus of the reference light and a second focus corresponding to a focus of the signal light, based on information about a reflective signal light generated when the irradiated signal light is reflected from a reflective transmission layer of the holographic data recording medium; and moving the second focus to a position of the first focus, based on the focus error signal.

The focus error signal may include a first focus error signal that indicates a distance difference between the first focus and the second focus in a direction of a first coordinate axis, a second focus error signal that indicates a distance difference between the first focus and the second focus in a direction of a second coordinate axis, and/or a third focus error signal that indicates a distance between the first focus and the second focus in a direction of a third coordinate axis, wherein the first coordinate axis, the second coordinate axis, and the third coordinate axis are coordinate axes of a three-dimensional (3D) space.

The moving of the second focus to the position of the first focus may include: moving the second focus along the first coordinate axis based on the first focus error signal; moving the second focus along the second coordinate axis based on the second focus error signal while a position on the first coordinate axis is fixed; and moving the third focus along the third coordinate axis based on the third focus error signal while the position on the first coordinate axis and the position on the second coordinate axis are fixed.

The method may further include: determining whether a distance difference between the first focus and the moved second focus is less than a threshold value; and in response to the determined distance difference between the first focus and the moved second focus being less than the threshold value, driving a servo controller that automatically controls servos in response to the focus error signal so that the second focus coincides with the first focus.

The determining of whether the distance difference between the first focus and the moved second focus is less than the threshold value may include: determining whether the distance difference between the first focus and the moved second focus with respect to the first coordinate axis is less than a first threshold value; determining whether the distance difference between the first focus and the moved second focus with respect to the second coordinate axis is less than a second threshold value; and determining whether the distance difference between the first focus and the moved second focus with respect to the third coordinate axis is less than a third threshold value.

The determining of whether the distance difference between the first focus and the moved second focus is less than the threshold value may further include determining whether an amplitude of the reflective signal light is greater than a predetermined threshold.

In response to the determined distance difference between the first focus and the moved second focus being less than the threshold value, the method may further include recording information about a position of the moved second focus in a storage space.

The method may further include moving the second focus based on the recorded information about the position of the second focus when the servo controller is re-driven.

According to another aspect of the present invention, there is provided an apparatus to control a position in which data is to be recorded on a holographic data recording medium by using interference between a reference light and a signal light, the apparatus including: a light source unit to irradiate the reference light and the signal light on the holographic data recording medium; a photodetector to detect a reflective signal light generated when the irradiated signal light is reflected from a reflective transmission layer of the holographic data recording medium; a focus error signal generator to generate a focus error signal that indicates a distance difference between a first focus corresponding to a focus of the reference light on the holographic data recording medium and a second focus corresponding to a focus of the signal light on the holographic data recording medium based on the reflective signal light; and a controller to control the apparatus so that the second focus is moved to a position of the first focus, based on the focus error signal.

According to another aspect of the present invention, there is provided a method of controlling a position in which data is to be recorded on a holographic data recording medium by using interference between a first light and a second light, the method including: generating a focus error signal that indicates a distance difference between a first focus corresponding to a focus of the first light irradiated on the holographic data recording medium and a second focus corresponding to a focus of the signal light irradiated on the holographic data recording medium, based on information about a reflective second light generated when the irradiated second light is reflected from a reflective transmission layer of the holographic data recording medium; and moving the second focus to a position of the first focus, based on the generated focus error signal.

According to yet another aspect of the present invention, there is provided an apparatus to control a position in which data is to be recorded on a holographic data recording medium by using interference between a first light and a second light, the apparatus including: a focus error signal generator to generate a focus error signal that indicates a distance difference between a first focus corresponding to a focus of the first light irradiated on the holographic data recording medium and a second focus corresponding to a focus of the second light irradiated on the holographic data recording medium, based on information about a reflective second light generated when the irradiated second light is reflected from a reflective transmission layer of the holographic recording medium, wherein the generated focus error signal is used to control a moving of the second focus to a position of the first focus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 15A and 15B are flowcharts illustrating a method of controlling a position in which data is to be recorded on the holographic data recording medium, according to another embodiment of the present invention.

DETAILED DESCRIPTION OF THE EMBODIMENTS

Figure 1:
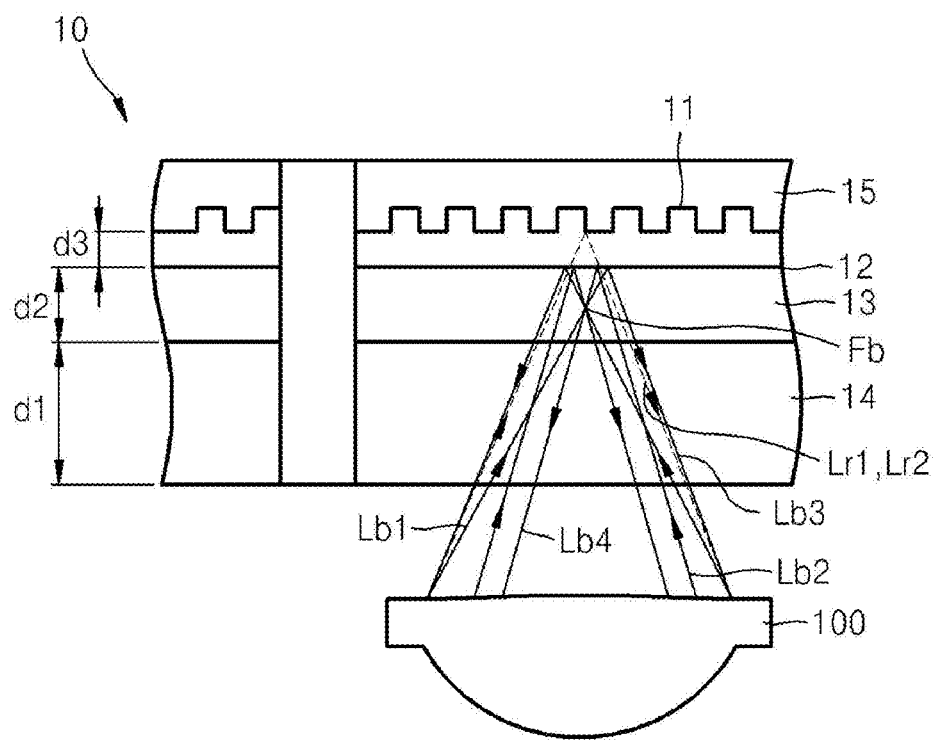
FIG. 1 illustrates a holographic data storage medium used in an apparatus to record holographic data, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a holographic data storage medium used in an apparatus to record holographic data, according to an embodiment of the present invention. Referring to FIG. 1, the holographic data storage medium 10 includes substrates 14 and 15, a reflective layer 11 from which a first light having a first wavelength (for example, a servo light Lr1 in the form of a red light) is reflected, a reflective transmission layer 12 through which the first light having the first wavelength is transmitted and from which a second light having a second wavelength different from the first light (for example, a blue light used to record and/or reproduce a hologram) is reflected, and a holographic medium layer 13 in which holographic data is recorded in an interference pattern. The holographic medium layer 13 is a medium layer in which a recording mark hologram is formed. The recording mark hologram (for example, a micro-hologram) is formed in a plane, thereby forming a single recording layer. In addition, a plurality of recording layers may be formed in a depth direction of the holographic medium layer 13. In FIG. 1, Lr1 and Lr2 denote a servo light incident on the reflective layer 11 and a servo light reflected from the reflective layer 11, respectively. Lb1 and Lb3 denote a reference light focused at a point and a reference light focused at a point Fb and then diverged and reflected from the reflective transmission layer 12, respectively. Lb2 and Lb4 denote a signal light reflected from the reflective transmission layer 12 and then focused at the point Fb and a reflective signal light passing the focus Fb and diverged, respectively. Fb denotes a focus point of a reference light.

The holographic data storage medium 10 may be in the form of a disk having a diameter of 120 mm (for example, a CD, a DVD, or a BD). A hole (not shown) may be formed in the middle of the holographic data storage medium 10. As illustrated in FIG. 1, the substrates 14 and 15 may be formed at bottom and top sides of the holographic data storage medium 10 respectively so as to protect the holographic medium layer 13 and the reflective layer 11. The substrates 14 and 15 may be formed of a material such as polycarbonate, glass, or the like.

Figure 2:
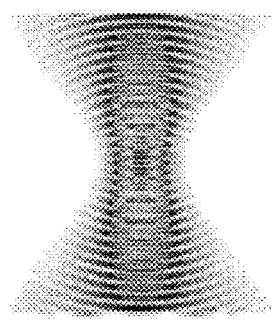
FIG. 2 is a photographic image of a recording mark hologram formed when a reference light and a signal light interfere with each other in a holographic medium layer of the holographic data storage medium illustrated in FIG. 1, according to an embodiment of the present invention.

The holographic medium layer 13 may be formed of a photopolymer whose reflective index is changed according to an intensity of light irradiated thereon. For example, the holographic medium layer 13 may react with a blue light having a wavelength of about 405 nm. When the reference light Lb1 as the blue light and the signal light Lb2 interfere with each other in the holographic medium layer 13, a hologram constituting a recording mark is formed, as illustrated in FIG. 2. In this case, the recording mark hologram may be a micro-hologram. The substrates 14 and 15 may have refractive indices that are the same as or similar to those of the holographic medium layer 13.

A thickness d2 of the holographic medium 13 is sufficiently larger (or at least equal to) than a depth of the recording mark. For example, the holographic medium layer 13 may be designed to have a thickness of about 150 μm. In FIG. 1, d1 denotes a thickness of the substrate 14 that ranges from a bottom surface of the holographic data storage medium 10 to the holographic medium layer 13, d2 denotes a thickness of the holographic medium layer 13, and d3 denotes a distance between the reflective transmission layer 12 and the reflective layer 11.

One recording layer may be formed in the holographic medium layer 13 according to hologram recording due to interference between the signal light Lb2 and the reference light Lb1. Recording is performed while a position where hologram recording is performed is changed in the depth direction of the holographic medium layer 13, thereby forming a plurality of recording layers. Here, the recording layers may be obtained by forming the recording mark hologram on the same plane.

Lands, grooves, pits, etc. may be formed in the reflective layer 11 so as to perform tracking and focusing servo operations. The first light having the first wavelength that is incident from the substrate 14 (for example, the servo light Lr1 in the form of a red light) is reflected from the reflective layer 11 back into the substrate 14.

The reflective transmission layer 12 is a wavelength selective, reflective layer through which the servo light Lr1 (for example, the red light) is transmitted and from which the second light having the second wavelength (for example, a blue light used to record and/or reproduce a hologram) is reflected. The reflective transmission layer 12 may be formed as a cholesteric liquid crystal layer and may have a circular polarization separation operation. Specifically, the cholesteric liquid crystal layer having the circular polarization separation operation has selective reflection characteristics such that when a spiral rotation direction (turn right or left) of a liquid crystal coincides with a circular polarization direction of the liquid crystal and a wavelength of the cholesteric liquid crystal layer is a spiral pitch of the liquid crystal, the cholesteric liquid crystal layer selectively reflects only its circular polarization component. For example, when the blue light is incident on the substrate 14 as right circular polarized light, light reflected from the reflective transmission layer 12 becomes right circular polarized.

As will be described later, when interference patterns are formed, the signal light Lb2 is reflected from the reflective transmission layer 12 and is then focused at the point Fb, and the reference light Lb1 is directly focused at the point Fb. In this case, the signal light Lb2 may be incident on the holographic data storage medium 10 as right circular polarized light, and the reference light Lb1 may be incident on the holographic data storage medium 10 as left circular polarized light. In consideration of this, basically, the signal light Lb2 as blue light that is right circular polarized, for example, may be reflected from the reflective transmission layer 12, and the reference light Lb1 as blue light that is perpendicular left circular polarized may be transmitted through the reflective transmission layer 12. In addition, a portion of the blue light that is left circular polarization polarized may be reflected from the reflective transmission layer 12 so that the reference light Lb1 can be used to adjust a position of a recording layer that will be described later.

As a more specific embodiment, the blue light that is left circular polarized only in a partial region (for example, around a center near a hole) of the holographic data storage medium 10 may be reflected from the reflective transmission layer 12, and the blue light that is right circular polarized in the remaining regions of the holographic data storage medium 10 may be reflected from the reflective transmission layer 12. In addition, the blue light that is right circular polarized over the entire region of the holographic data storage medium 10 may be primarily reflected from the reflective transmission layer 12, and a portion of the blue light that is left circular polarized may be reflected from the reflective transmission layer 12.

Figure 3:
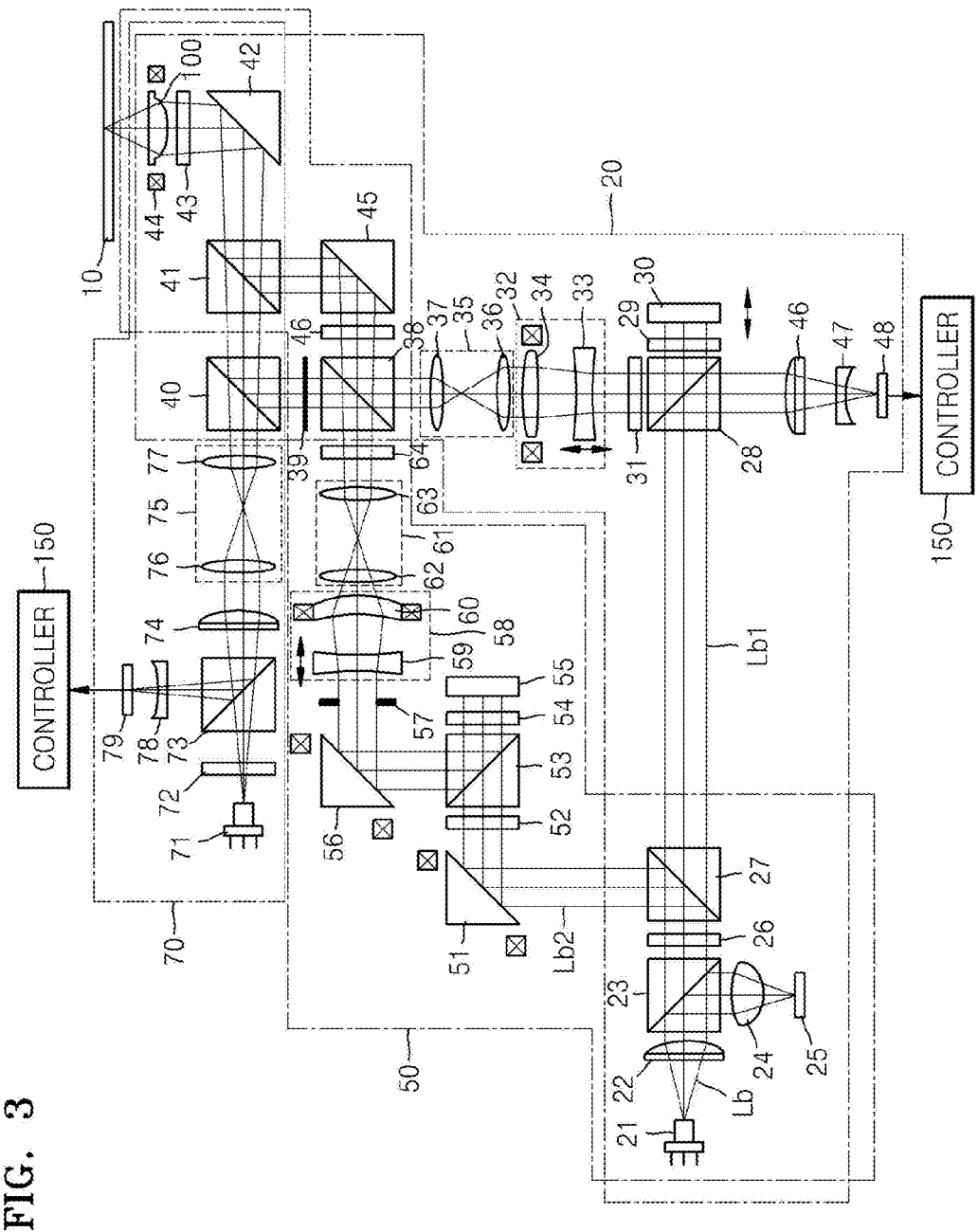
FIG. 3 is a block diagram of an apparatus to record and/or reproduce holographic data in which a position of a recording layer is adjustable, according to an embodiment of the present invention.

FIG. 3 is a block diagram of an apparatus to record and/or reproduce holographic data in which a position of a recording layer can be adjusted, according to an embodiment of the present invention. Referring to FIG. 3, the apparatus to record and/or reproduce holographic data includes a first light source 71 to emit a light having a first wavelength used as a servo light, a second light source 21 to emit a light having a second wavelength used as a reference light or signal light, an objective lens 100 to condense the servo light, the reference light, and the signal light on the holographic data storage medium 10, a driving unit 44 to drive the objective lens 100, a first photodetector 79 to detect the servo light reflected from the reflective layer 11 of the holographic data storage medium 10, a second photodetector 48 to detect the reference light and the signal light reflected from the reflective transmission layer 12 of the holographic data storage medium 10, and a controller 150 to control the apparatus to record and/or reproduce holographic data to adjust focal positions of the servo light and the signal light in the holographic medium layer 13 of the holographic data storage medium 10 based on the servo light. While not required, the controller 150 can be one or more processors or processing elements on one or more chips or integrated circuits.

The apparatus to record and/or reproduce holographic data includes a servo optical system 70 including the first light source 71 and the first photodetector 79, a hologram recording optical system (a signal light optical system) 50 including the second light source 21, and a hologram recording and/or reproducing optical system (a reference light optical system) 20 including the second photodetector 48. The apparatus to record and/or reproduce holographic data will now be described in more detail.

Figure 4:
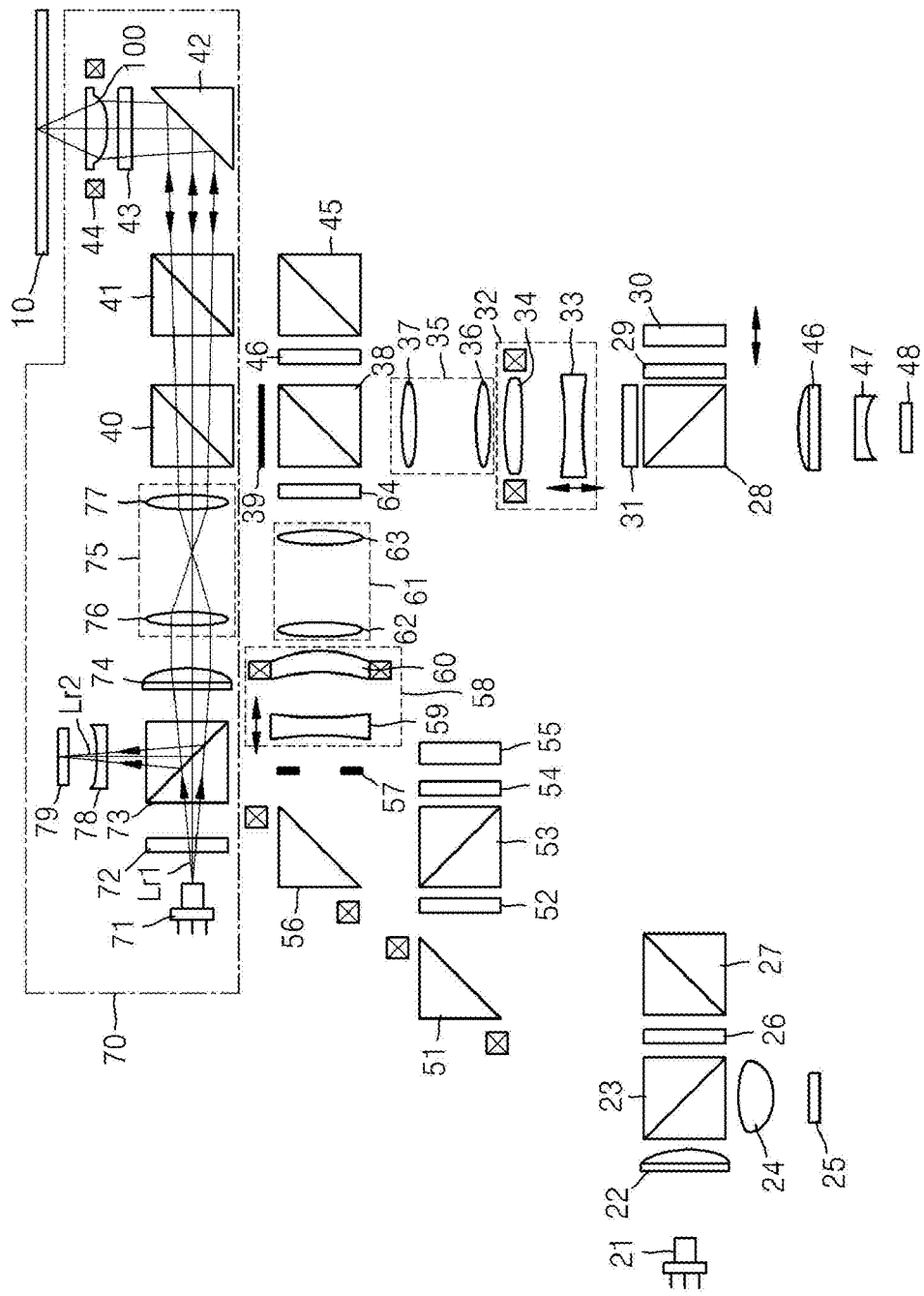
FIG. 4 illustrates an optical path of a servo light in the apparatus to record and/or reproduce holographic data illustrated in FIG. 3, according to an embodiment of the present invention.

First, an optical path of a servo light used to control a recording and/or reproducing position in the apparatus to record and/or reproduce holographic data illustrated in FIG. 3, according to embodiments of the present invention will be described with reference to FIG. 4. FIG. 4 illustrates an optical path of a servo light in the apparatus to record and/or reproduce holographic data illustrated in FIG. 3, according to an embodiment of the present invention. Referring to FIG. 4, the servo optical system 70 irradiates a first light having a first wavelength emitted from the first light source 71 (i.e., a servo light Lr1 having a red wavelength) on the substrate 14 and receives a servo light Lr2 reflected from the reflective layer 11.

The servo light Lr1 may have a wavelength of about 660 nm. The servo light Lr1 diverged by the first light source 71 is divided by a grating 72 into three beams including one main beam and two subbeams, is transmitted through a polarization beam splitter 73, and is incident on a collimating lens 74. The grating 72 may distribute the amount of light of the main beam to be greater than or equal to an amount of light of the sub-beams. In FIG. 4, illustration of the sub-beams is omitted. The polarization beam splitter 73 may transmit a p-polarization component of the incident servo light Lr1 and may reflect an s-polarization component of the incident servo light Lr1. The collimating lens 74 converts the servo light Lr1 diverged from the first light source 71 into parallel light. The servo light Lr1 converted into the parallel light is incident on a correction lens 75. The correction lens 75 includes two focusing lenses 76 and 77. The servo light Lr1 transmitted through the correction lens 75 is transmitted through dichroic prisms 40 and 41, is reflected by a mirror 42, is incident on a quarter wave plate (QWP) 43, is converted into circular polarized light, and is incident on the objective lens 100. The objective lens 100 condenses the servo light Lr1 on the reflective layer 11, forms a focus Fr on the reflective layer 11, and is reflected from the reflective layer 11 as the servo light Lr2 so as to proceed in a direction opposite to that of the incident servo light Lr1.

Almost 100% of the servo light (for example, the red light) is transmitted through the dichroic prism 40, and almost 100% of the light to record and/or reproduce a hologram (the reference light in the optical system of FIG. 3, such as the blue light) is reflected by the dichroic prism 40. For example, almost 100% of a p-polarization component of the blue light may be transmitted through the dichroic prism 41, and almost 100% of an s-polarization component of the blue light may be reflected by the dichroic prism 40. Almost 100% of the red light and the blue light may be reflected by the mirror 42, and the QWP 43 may convert straight polarized light of all of the red light and the blue light into circular polarized light.

The servo light Lr2 is sequentially transmitted through the objective lens 100, the QWP 43, the mirror 42, the dichroic prisms 40 and 41, and the correction lens 75. Furthermore, the servo light Lr2 is converted into a parallel beam, is condensed by the collimating lens 74, is reflected by the polarization beam splitter 73, and is received by the first photodetector 79. The apparatus to record and/or reproduce holographic data may further include an astigmatism lens (for example, a cylindrical lens 78) that is disposed between the polarization beam splitter 73 and the first photodetector 79. The cylindrical lens 78 performs a focus servo operation due to astigmatism generated in the reflective servo light Lr2.

Since the holographic data storage medium 10 that rotates in the apparatus to record and/or reproduce holographic data may be deflected or eccentric, there is a possibility that a target track and a corresponding focal position of the holographic data storage medium 10 may be changed. Thus, the focus of the servo light Lr1 in the servo optical system 70 is to be positioned in the target track and the corresponding focal position. To this end, the servo light Lr1 is moved in a focusing direction and a tracking direction, corresponding to a thickness direction and a radial direction of the holographic data storage medium 10, respectively.

The driving unit 44 may be a two-axis actuator, and the objective lens 100 may be driven in two axes (i.e., the focusing direction and the tracking direction) so that the servo light Lr1 can move in the focusing direction and the tracking direction. In addition, the driving unit 44 may be a three-axis actuator, and the objective lens 100 may be driven with respect to radial tilt as well as in the focusing and tracking directions.

Figure 5:
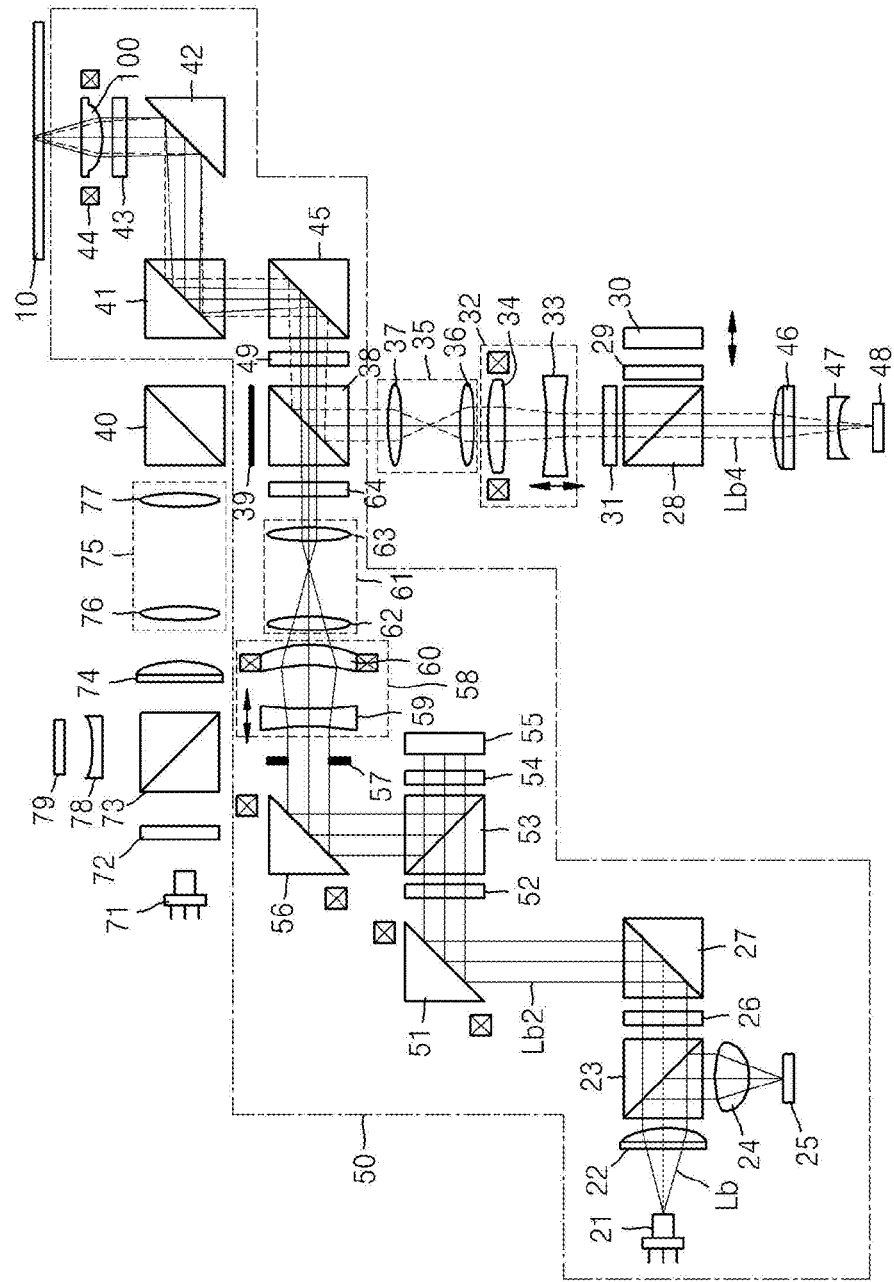
FIG. 5 illustrates an optical path of a signal light in the apparatus to record and/or reproduce holographic data illustrated in FIG. 3, according to an embodiment of the present invention.
Figure 6:
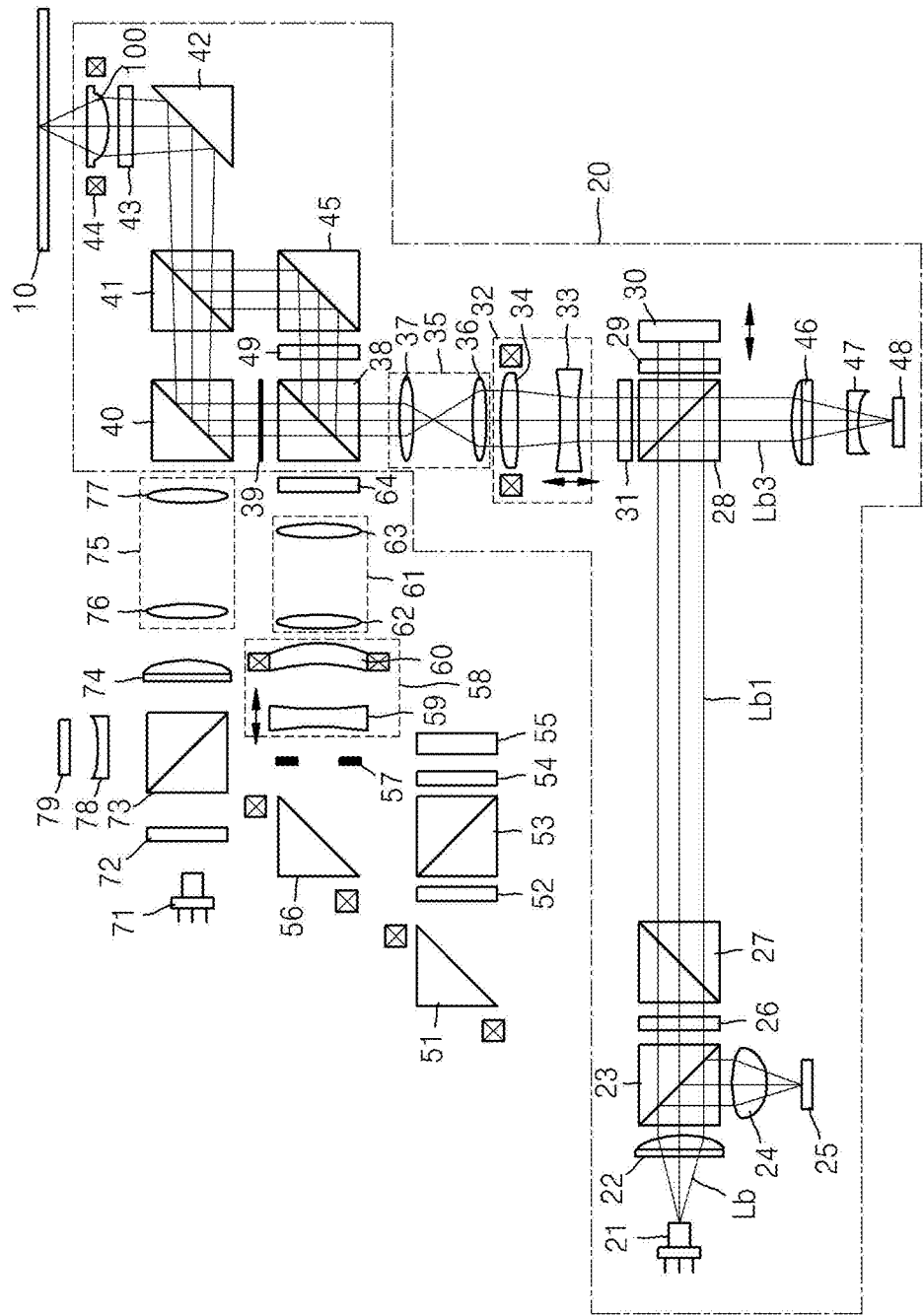
FIG. 6 illustrates an optical path of a reference light in the apparatus to record and/or reproduce holographic data illustrated in FIG. 3, according to an embodiment of the present invention.

Hereinafter, optical paths of a signal light and a reference light, which are used to record and/or reproduce data to/from the apparatus to record and/or reproduce holographic data illustrated in FIG. 3, according to embodiments of the present invention, will be described with reference to FIGS. 5 and 6. FIG. 5 illustrates an optical path of a signal light in the apparatus to record and/or reproduce holographic data illustrated in FIG. 3, according to an embodiment of the present invention, and FIG. 6 illustrates an optical path of a reference light in the apparatus to record and/or reproduce holographic data illustrated in FIG. 3, according to an embodiment of the present invention.

The optical system to record and/or reproduce a hologram may irradiate the second light (hereinafter, the blue light Lb) having the second wavelength emitted from the second light source 21 on the substrate 14, and may receive the blue light Lb reflected from the reflective transmission layer 12. Referring to FIGS. 5 and 6, the optical system to record and/or reproduce a hologram includes a signal light optical system 50 that contributes to transmitting the signal light Lb2 in a recording mode, and a reference light optical system 20 that contributes to transmitting the reference light Lb1 in a recording mode and during reproduction.

The second light having the second wavelength (i.e., the blue light Lb having a wavelength of about 405 nm) is emitted and diverged from the second light source 21 of the optical system to record and/or reproduce a hologram. The blue light Lb is incident on the collimating lens 22 and is converted into parallel light. The blue light Lb converted into the parallel light is transmitted through an active half wave plate 26 and is reflected by or transmitted through the polarization beam splitter 27. Here, a case in which the blue light Lb reflected by the polarization beam splitter 27 is used as the signal light Lb2 and the blue light Lb transmitted through the polarization beam splitter 27 is used as the reference light Lb1 will now be described.

The active half wave plate 26 is an on/off type half wave plate. That is, if power is applied to the active half wave plate 26, the active half wave plate 26 may act as a half wave plate, and if power is not applied to the active half wave plate 26, the active half wave plate 26 may not act as a half wave plate. Thus, when power is applied to the active half wave plate 26 and the active half wave plate 26 acts as a half wave plate, a polarization direction of the incident blue light Lb is rotated by the active half wave plate 26 at a predetermined angle, and the signal light Lb2 including an s-polarization component is reflected by the polarization beam splitter 27. Conversely, the reference light Lb1 including a p-polarization component is transmitted through the polarization beam splitter 27. Here, in a reproduction mode, power is not applied to the active half wave plate 26, and the active half wave plate 26 does not act as a half wave plate. As such, the blue light Lb emitted from the second light source 21 (for example, all or most of the p-polarized blue light Lb) is transmitted through the polarization beam splitter 27 and proceeds along a proceeding path of the reference light Lb1 in a recording mode. Here, it is assumed that the blue light Lb emitted from the second light source 21 is p-polarized.

In another embodiment, the active half wave plate 26 includes a rotation driving unit on a half wave plate so that a polarization direction is rotated at a predetermined angle and a distribution of intensity of s-polarization and p-polarization can be adjusted according to a rotation angle.

The blue light Lb emitted from the second light source 21 is divided by the polarization beam splitter 27 into approximately 50% reference light Lb1 and approximately 50% signal light Lb2. In this regard, the active half wave plate 26 may be used to adjust the division ratio.

FIG. 5 illustrates an optical path of the signal light Lb2 in the apparatus to record and/or reproduce holographic data illustrated in FIG. 3, according to an embodiment of the present invention. Referring to FIG. 5, in the signal light optical system 50, the s-polarized signal light Lb2 is reflected by a galvano mirror 51, is converted by a half wave plate 52 into p-polarized light, is transmitted through the polarization beam splitter 53, is converted by a quarter wave plate (QWP) 54 into circular polarized light, and is re-reflected by a mirror 55. The re-reflected signal light Lb2 is converted by the QWP 54 into s-polarized light, is reflected by the polarization beam splitter 53, and is incident on another galvano mirror 56.

The galvano mirrors 51 and 56 are used to change an angle of reflected light. The controller 150 may control the galvano mirrors 51 and 56 to adjust a proceeding direction of the signal light Lb2. The signal light Lb2 reflected by the galvano mirror 56 is transmitted through a slit 57 and is incident on a beam expander 58. The beam expander 58 includes two actuating lenses 59 and 60. The signal light Lb2 is diverged by the actuating lens 59, is focused by the actuating lens 60, is transmitted through a relay lens 61, is incident on the half wave plate 64, and is converted into p-polarized light.

Here, as stated above, the beam expander 58 includes two actuating lenses 59 and 60. The first actuating lens 59 may move in a direction of an optical axis by using a stepping motor or a piezo motor and may be controlled coarsely. The second actuating lens 60 may be moved in the direction of the optical axis by using an actuator that is similar to the driving unit 44 for the objective lens 100 and may be controlled finely.

For example, the first actuating lens 59 may position the signal light Lb2 in the general vicinity of a recording layer when a recording layer is moved in a thickness direction of the holographic data storage medium 10, and the second actuating lens 60 may exactly position the signal light Lb2 on the recording layer. A movement distance of the first actuating lens 59 may be greater than a movement distance of the second actuating lens 60.

The relay lens 61 is used to obtain a distance between the objective lens 100 and the second actuating lens 60 of the beam expander 58, and may include two convex lenses 62 and 63.

The p-polarized signal light Lb2 that is transmitted through the half wave plate 64 is transmitted through a polarization beam splitter 38 and is incident on an active half wave plate 46. A polarization direction of the incident, p-polarized signal light Lb2 is rotated by the active half wave plate 46 that is driven (for example, when power is applied) at a predetermined angle and is converted to mainly include an s-polarization component. For example, the p-polarized signal light Lb2 may be converted by the active half wave plate 46 to include approximately 70% of an s-polarization component and approximately 30% of a p-polarization component.

The signal light Lb2 is reflected by the mirror 45, and only the s-polarization component of the signal light Lb2 is incident on the mirror 42 due to the dichroic prism 41 and is converted into right circular polarized light, for example, due to the QWP 43 and is incident on the objective lens 100. The signal light Lb2 is condensed by the objective lens 100 and is reflected from the reflective transmission layer 12 including a cholesteric liquid crystal layer and forms a focus at a point Fb. The objective lens 100 may condense the signal light Lb2 and may act as a condensing lens having a numerical aperture (NA) of about 0.4, for example, due to an optical distance between the objective lens 100 and the beam expander 58.

The signal light Lb2 that is condensed on the focus Fb is diverged and is re-incident on the objective lens 100. Here, the reflective signal light is referred to as Lb4. The reflective signal light Lb4 is reflected from the reflective transmission layer 12 including the cholesteric liquid crystal layer and has the same circular polarization as the signal light Lb2. The reflective signal light Lb4 is converted by the QWP 43 into s-polarized light, is reflected by the mirror 42, the dichroic prism 41, and the mirror 45, and is incident on the active half wave plate 49. The s-polarization reflective signal light Lb4 is converted by the active half wave plate 46 to include approximately 30% of an s-polarization component and about 70% of a p-polarization component, for example, and the s-polarization component of the reflective signal light Lb4 is reflected by the polarization beam splitter 38. The reflective signal light Lb4 having the reflected, s-polarization component is transmitted through the relay lens 35 and is incident on a beam expander 32. The reflective signal light Lb4 is converted by a half wave plate 31 into p-polarized light, is transmitted through a polarization beam splitter 28, is condensed by the objective lens 100, and is received by the second photodetector 48 due to astigmatism generated by the cylindrical lens 47. Here, the relay lens 35 and the beam expander 32 may perform the same operations as those of the relay lens 61 and the beam expander 58 described above. The relay lens 35 includes two block lenses 36 and 37, and the beam expander 32 includes two actuating lenses 33 and 34.

Since the holographic data storage medium 10 may be deflected and eccentric, there is a possibility that a target track and a corresponding focal position of the holographic data storage medium 10 may be changed. Thus, focusing and tracking control are performed by the servo optical system using the servo light Lr1 (for example, the red light) and the controller 150. However, the signal light Lb2 may deviate from a position of the focus Fb of the reference light Lb1 due to a movement of the objective lens 100.

Thus, in the signal light optical system 50, optical positions of various optical parts may be adjusted by reflecting the state in which the reflective signal light Lb4 is received by the second photodetector 48 due to the amount by which the focus of the signal light Lb2 deviates from the focus Fb of the reference light Lb1 positioned in the holographic medium layer 13.

FIG. 6 illustrates an optical path of the reference light Lb1 in the apparatus to record and/or reproduce holographic data illustrated in FIG. 3, according to an embodiment of the present invention. Referring to FIG. 6, in the reference light optical system 20, the blue light Lb emitted from the second light source 21 is incident on the collimating lens 22 and converted into parallel light. The parallel light is transmitted through the through the active half wave plate 26 and converted into an s-polarization component and a p-polarization component. The s-polarization component of the blue light Lb is reflected by the polarization beam splitter 27 and is used as the signal light Lb2, as described with reference to FIG. 5. On the other hand, the p-polarization component of the blue light Lb may be transmitted through the polarization beam splitter 27 and may be used as the reference light Lb1.

The reference light Lb1 that is transmitted through the polarization beam splitter 27 is incident on the polarization beam splitter 28. The p-polarized reference light Lb1 that is transmitted through the polarization beam splitter 28 is converted by the QWP 29 into left circular polarized light, is reflected by the mirror 30, is converted by the QWP 29 into s-polarized light, is reflected by the polarization beam splitter 28, and proceeds toward the half wave plate 31. The s-polarized reference light Lb1 is converted by the half wave plate 31 into p-polarized light and is incident on the beam expander 32.

Here, the mirror 30 is movably disposed and may adjust lengths of optical paths of the reference light Lb1 and the signal light Lb2 by changing the length of an optical path of the reference light Lb1 due to a movement of the mirror 30. In order to adjust the lengths of the optical paths of the reference light Lb1 and the signal light Lb2, the mirror 55 in the signal light optical system 50 may be driven or both the mirror 55 in the signal light optical system 50 and the mirror 30 in the reference light optical system 20 may be driven. When a laser diode is used as the second light source 21, a coherence length in the laser diode is approximately several hundreds of microns. Thus, when a difference in the lengths of the optical paths of the reference light Lb1 and the signal light Lb2 is equal to or greater than the coherence length, a recording mark (i.e., hologram) formed on the focus between the reference light Lb1 and the signal light Lb2 may not be accurately recorded. Thus, in order to form a good hologram, the difference between the lengths of the optical paths of the reference light Lb1 and the signal light Lb2 may be adjusted to be equal to or less than the coherence length by adjusting the mirror 30, for example.

The p-polarized reference light Lb1 that is incident on the beam expander 32 is diverged by the actuating lens 33 and is re-converged by the actuating lens 34. The reference light Lb1 that is transmitted through the beam expander 32 is transmitted through the relay lens 35 and is incident on the polarization beam splitter 36. The reference light Lb1 is p-polarized, as described above, and is thus transmitted through the polarization beam splitter 36 and is incident on a shutter 39.

As described above, the beam expander 32 and the relay lens 35 of the reference light optical system 20 may perform the same operations as those of the beam expander 58 and the relay lens 61 of the signal light optical system 50.

The shutter 39 is controlled by the controller 150 so that the reference light Lb1 is intercepted by or is transmitted through the shutter 39. When the reference light Lb1 is transmitted through the shutter 39, the reference light Lb1 is p-polarized blue light, is reflected by the dichroic prism 40, is transmitted through the dichoric prism 41, and is incident on the mirror 42. Furthermore, the reference light Lb1 is reflected by the mirror 42, is converted by the QWP 43 into left circular polarized light, and is condensed by the objective lens 100 on the holographic data storage medium 10.

The objective lens 100 condenses the reference light Lb1. In this case, the objective lens 100 may act as a condensing lens having a NA of approximately 0.65, for example, due to the optical distance between the objective lens 100 and the beam expander 32. Here, the NA of the objective lens 100 with respect to the reference light Lb1 is greater than the NA of the objective lens 100 with respect to the signal light Lb2, because the reference light Lb1 is condensed by the objective lens 100 and is directly focused at the point Fb. In contrast, the signal light Lb2 is condensed by the objective lens 100, is reflected from the reflective transmission layer 12, and is focused at the point Fb and the focal distance of the signal light Lb2 may be greater than the focal distance of the reference light Lb1. It is understood that aspects of the present invention are not limited to the reference light Lb1 being directly focused at the point Fb and the signal light Lb2 being reflected from the reflective transmission layer 12 and focused at the point Fb. For example, according to other aspects, the signal light Lb2 may be directly focused at the point Fb and the reference light Lb1 may be reflected from the reflective transmission layer 12 and focused at the point Fb.

In a recording mode, the reference light Lb1 that is reflected from the reflective transmission layer 12 of the holographic data storage medium 10 does not return to the objective lens 100. The reflective transmission layer 12 including the cholesteric liquid crystal layer has characteristics such that only right circular polarized light is reflected from the reflective transmission layer 12. Accordingly, as the reference light Lb1 that is incident on the holographic data storage medium 10 is left circular polarized light, the reference light Lb1 is not reflected from the reflective transmission layer 12.

As described above, when a blue light that is left circular polarized in a partial region (for example, around a center near a hole) of the holographic data storage medium 10 is incident on the reflective transmission layer 12 and the blue light that is right circular polarized in the remaining regions of the holographic data storage medium 10 is reflected from the reflective transmission layer 12, recording may be performed in a region in which only the blue light that is right circular polarized is reflected. In this case, none of the reference light Lb1 that is reflected from the reflective transmission layer 12 returns to the objective lens 100, in a region in which recording is performed. When the blue light that is right circular polarized is primarily reflected and a portion of the blue light that is left circular polarized is reflected over the entire region of the holographic data storage medium 10, the signal light Lb2 that is right circular polarized may be primarily reflected from the reflective transmission layer 12, and a portion of the reference light Lb1 that is left circular polarized may be reflected from the reflective transmission layer 12 during recording. In this case, the reference light Lb1 that is left circular polarized may be reflected and may be a reflective reference light Lb3 that is right circular polarized.

In a reproduction mode, the active half wave plate 26 does not act as a half wave plate. Accordingly, the p-polarized blue light Lb emitted from the second light source 21 is transmitted through the active half wave plate 26 without a change of polarization, is transmitted through the polarization beam splitter 27, and proceeds along the optical path of the reference light Lb1 in a recording mode. Thus, the blue light used in the reproduction mode is the same as the reference light Lb1 in the recording mode, and it is assumed that the blue light in the reproduction mode is the reference light Lb1.

When a mark recorded in the holographic medium layer 13 of the holographic data storage medium 10 (i.e., a hologram) is reproduced, a reference light used to reproduce the hologram (hereinafter, referred to as a reproduction light) is incident on the objective lens 100. The reference light Lb1 is incident on the holographic data storage medium 10 in a left circular polarization state, a proceeding direction of the reproduction light reflected by the hologram is changed, and a rotation direction of a field vector is not changed. Thus, the reproduction light reflected by the hologram becomes right circular polarized light. The right circular polarized reference light is changed by the QWP 43 into s-polarized light, is reflected by the mirror 42, is reflected by the dichoric prism 41, is reflected by the mirror 45, and is incident on the active half wave plate 46. Since power is not applied to the active half wave plate 46 during reproduction and the active half wave plate 46 does not act as a half wave plate, s-polarized reproduction light is transmitted through the active half wave plate 46 without a change of polarization, is reflected by the polarization beam splitter 38, and is incident on the relay lens 35. Furthermore, the s-polarized reproduction light that is transmitted through the relay lens 35 is transmitted through the beam expander 32, is changed into a parallel beam, is converted by the half wave plate 31 into p-polarized light, and is transmitted through the polarization beam splitter 28. The transmitted, p-polarized reproduction light is condensed on the condensing lens 46, is transmitted through the cylindrical lens 47, and is received by the second photodetector 48. Recording mark hologram data recorded in a predetermined recording layer is checked by using the reproduction light signal detected by the second photodetector 48.

Figure 7:
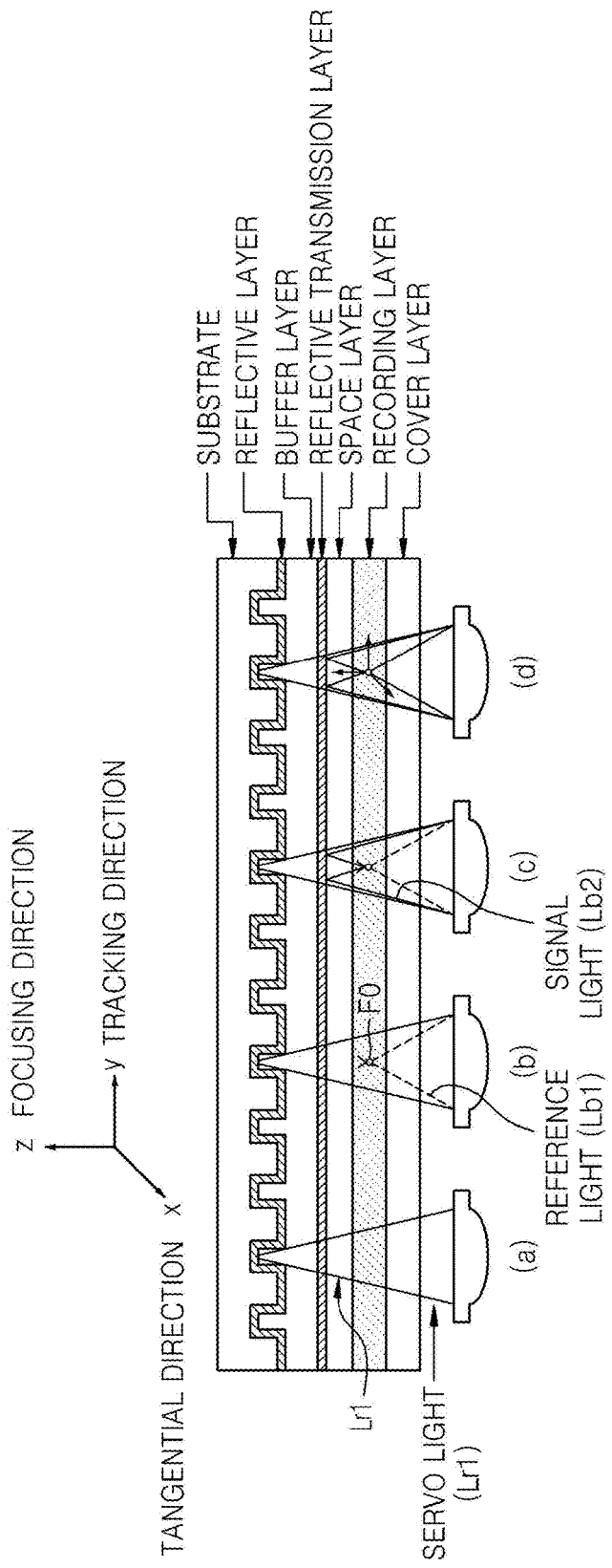
FIG. 7 illustrates an order for determining a position in which data is to be recorded, in the apparatus to record and/or reproduce holographic data illustrated in FIG. 3, according to an embodiment of the present invention.

FIG. 7 illustrates an order to determine a position in which data is to be recorded, in the apparatus to record and/or reproduce holographic data illustrated in FIG. 3, according to an embodiment of the present invention. Referring to FIG. 7, first, the servo light Lr1 is irradiated on the holographic data storage medium 10 by using the servo optical system 70. Accordingly, focusing and tracking control is performed by the servo optical system 70 by using the reflective servo light Lr2 reflected from the reflective layer 11 so that a focus of the servo light Lr1 is formed on a target track ((a) of FIG. 7).

Next, the reference light Lb1 is irradiated on the holographic data storage medium 10. A focal position of the reference light Lb1 is controlled by using the objective lens 100 so that a focus of the reference light Lb1 is formed on a target track. In addition, the position of the actuating lens 34 of the beam expander 32 is adjusted so that the focus of the reference light Lb1 is formed on the target track ((b) of FIG. 7).

Next, the signal light Lb2 is irradiated on the holographic data storage medium 10. In (c) of FIG. 7, a focus of the signal light Lb2 and a focus of the reference light Lb1 do not coincide with each other. Thus, tangential, tracking, and focusing control is performed by using the reflective signal light Lb2 reflected from the reflective transmission layer 12. In this case, the galvano mirrors 51 and 56 and the actuating lens 60 of the beam expander 58 are operated based on the result of detecting the reflective signal light Lb2 so that a focal position of the signal light Lb2 is moved.

Referring to (d) of FIG. 7, the focus of the signal light Lb2 and the focus of the reference light Lb1 coincide with each other. However, the focus of the signal light Lb2 and the focus of the reference light Lb1 may not coincide with each other due to additional causes (for example, disturbance such as side vibration or eccentricity of a disk or a difference in the thickness of the reflective transmission layer 12 even though the disturbance can be prevented by a focusing and tracking servo operation performed by the servo optical system 70 in three directions, such as focusing, track, and tangential directions). To prevent deviation of focus, a servo controller that automatically controls servos in response to a focus error signal or a sum signal so that the focus of the signal light and the focus of the reference light coincide with each other, may operate.

Figure 8A:
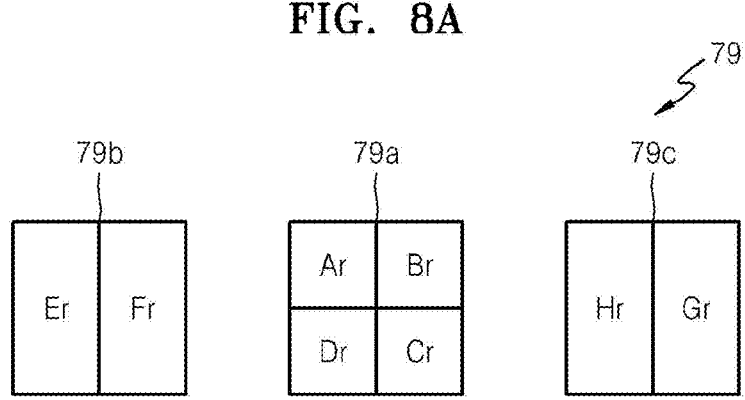
FIGS. 8A and 8B illustrate a photodetector according to an embodiment of the present invention.
Figure 8B:
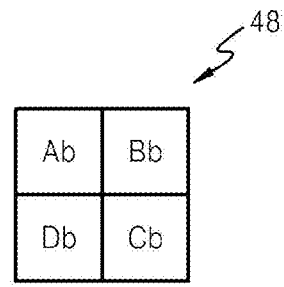

Hereinafter, an operation of controlling focal positions of the servo light Lr1, the reference light Lb1, and the signal light Lb2 will be described with reference to FIGS. 8 through 11. First, an operation of controlling the focus of the servo light Lr1 will now be described. FIGS. 8A and 8B illustrate the first and second photodetectors 79 and 48 according to embodiments of the present invention. The servo light Lr1 emitted from the first light source 71 is condensed by the objective lens 100 on the reflective layer 11 and is reflected from the reflective layer 11. The reflective servo light Lr2 is received by the first photodetector 79 and reflects focusing and tracking states.

Referring to FIG. 8A, in order to detect a focus error signal and a tracking error signal, the first photodetector 79 may include a main photodetector 79a including four light-receiving regions Ar, Br, Cr, and Dr so as to receive main beams. The first photodetector 79 may further include first and second sub-photodetectors 79b and 79c respectively including two light-receiving regions Er and Fr and Hr and Gr respectively disposed at both sides of the main photodetector 79a in a radial direction so as to receive sub-beams.

Focus control may be performed by using astigmatism using signals detected by the main photodetector 79a. A focus error signal FESr using a main beam detection signal that is received by the main photodetector 79a may be obtained by using Equation 1 below. The focus error signal FESr is input to the controller 150 and is used to focus control the objective lens 100. For convenience of explanation, a light-receiving region of a photodetector and a signal detected by the photodetector are represented by the same symbol. Equation 1 is as follows:

$$FESr = (Ar+Cr) - (Br+Dr) \quad (1).$$

Tracking control may be performed by using a differential push pull method using signals detected by the first and second sub-photodetectors 79b and 79c. A tracking error signal DPPr that is obtained using the differential push pull method indicates an amount corresponding to the amount by which the servo light Lr1 deviates from a target track and may be obtained by using Equation 2 below:

$$MPPr = (Ar+Dr) - (Br+Cr)$$

$$SPPr1 = Er - Fr$$

$$SPPr2 = G1 - Hr$$

$$DPPr = MPPr - k(SPPr1 + SPPr2)$$

where k is a gain.

As described above, the servo optical system 70 using the servo light Lr1 irradiates the servo light Lr1 on the reflective layer 11 of the holographic data storage medium 10 and performs focusing and tracking control of the objective lens 100 by using the detection signal of the reflective servo light Lr2.

Next, an operation of controlling the focus of the reference light Lb1 will now be described. The controller 150 adjusts a position of a recording layer in which data is to be recorded, by adjusting a position of the focus Fb of the second light in the holographic data storage medium 10 (for example, the position of the focus Fb of the reference light Lb1) and processes signals detected by the first and second photodetectors 79 and 48 for this purpose. In addition, the controller 150 controls the driving unit 44 to drive the objective lens 100 in response to the processed signals and controls the focus movement unit (for example, the actuating lens 32 of the beam expander 32) to adjust a focal position of the second light. Here, the controller 150 may control several elements, though it is understood that some of the elements may be controlled by one or more additional controllers in other embodiments. The controller 150 may include a signal processing unit (not shown) to obtain signals used in control, such as a sum signal, a focus error signal, a tracking error signal, and a tangential error signal. According to other aspects, the signal processing unit (not shown) may be separately provided, and signals obtained by the signal processing unit (not shown) may be input to the controller 150.

The controller 150 controls a focus movement unit while the objective lens 100 makes a reciprocating motion in a direction of an optical axis, until a time difference between the time at which a first detection signal is generated when the servo light Lr1 is reflected from the reflective layer 11 and the time at which a second detection signal is generated when the reference light Lb1 is reflected from the reflective transmission layer 12 equates to a value corresponding to a desired position of the recording layer. The focus movement unit moves the focus of the reference light Lb1 in the direction of the optical axis due to a control performed by the controller 150 so that the focal position of the reference light Lb1 can be moved to the desired position of the recording layer.

However, it is understood that all embodiments are not limited to such a control. For example, according to another embodiment, the controller 150 controls the focus movement unit while the objective lens 100 makes a reciprocating motion in the direction of the optical axis, until a position of a first detection signal of a servo light Lr2 reflected from the reflective layer 11 is the same as a position of a second detection signal based on a reference light Lb3 reflected from the reflective transmission layer 12. The position of the focus movement unit at the time at which the position of the first detection signal of the servo light Lr2 reflected from the reflective layer 11 is the same as the position of the second detection signal based on the reference light Lb3 reflected from the reflective transmission layer 12 by using the focus movement unit, is set as a reference position of the focus movement unit. Thereafter, the servo light Lr1 is focused on the reflective layer 11 by using the objective lens 100, and the focus movement unit moves by displacement from the reference position so that the focus Fb of the reference light Lb1 can be placed in a target position. In addition, the reference position of the focus movement unit may be stacked on a memory, and the focus Fb of the reference light Lb1 may be easily moved to the target position by using the relationship between further movement of the focus movement unit and further movement of the focal position of the reference light Lb1.

In this case, the first detection signal may be a sum signal (Ar+Br+Cr+Dr) of signals detected in light-receiving regions of the main photodetector 79a of the first photodetector 79, or a focus error signal. In addition, the second detection signal may be a sum signal (Ab+Bb+Cb+Db) of signals detected in a plurality of light-receiving regions of the second photodetector 48, or a focus error signal.

An operation of controlling the focus of the signal light Lb2 will now be described. In a recording mode, in order to perform focusing and tracking control of the signal light Lb2, the second photodetector 48 may include four light-receiving regions Ab, Bb, Cb, and Db, as illustrated in FIG. 8B. The second photodetector 48 detects the reflective signal light Lb4 from the four light-receiving regions Ab, Bb, Cb, and Db. A signal processing unit (not shown) generates an error signal that indicates a distance difference between the focus Fb of the reference light Lb1 and the focus of the signal light Lb2 based on the reflective signal light Lb4.

The error signal may include a focus error signal that indicates a distance difference between the focus Fb of the reference light Lb1 and the focus of the signal light Lb2 in a focusing direction, a tracking error signal that indicates a distance difference between the focus Fb of the reference light Lb1 and the focus of the signal light Lb2 in a tracking direction, and/or a tangential error signal that indicates a distance difference between the focus Fb of the reference light Lb1 and the focus of the signal light Lb2 in a tangential direction.

The signal processing unit (not show) performs focusing control due to astigmatism, calculates a focus error signal FEb from detection signals generated in the four light-receiving regions Ab, Bb, Cb, and Db by using Equation 3 below, and supplies the calculated focus error signal FEb to the controller 150. As described above, the signal processing unit may be included in the controller 150 or may be separately provided. Equation 3 is as follows:

$$FEb = (Ab + Cb) - (Bb + Db) \quad (3),$$

where the focus error signal FEb indicates a difference in the focusing direction between the focus Fb of the reference light Lb1 and the focus of the signal light Lb2.

Tracking control is performed by using a push pull signal. A tracking error signal TEb is calculated by using Equation 4 below and is supplied to the controller 150. Equation 4 is as follows:

$$TEb = (Ab + Db) - (Bb + Cb) \quad (4),$$

where the tracking error signal TEb indicates a difference in the tracking direction between the focus Fb of the reference light Lb1 and the focus of the signal light Lb2.

Meanwhile, a tangential error signal NEb that is used to perform tangential control may be generated by using Equation 5 below. In the tangential control, the signal light Lb2 is positioned on the focus Fb of the reference light Lb1 with respect to a tangential direction of the holographic data storage medium 10. Equation 5 is as follows:

$$NEb = (Ab + Bb) - (Cb + Db) \quad (5),$$

where the tangential error signal NEb indicates a difference in the tangential direction of the holographic data storage medium 10 between the focus Fb of the reference light Lb1 and the focus of the signal light Lb2.

The controller 150 may generate a focus driving signal based on the focus error signal FEb, supply the focus driving signal to the actuating lens 60 of the beam expander 58, and focus control the actuating lens 60 so as to reduce the difference in the focusing direction between the focus Fb of the reference light Lb1 and the focus of the signal light Lb2. In addition, the controller 150 may generate a track driving signal based on the tracking error signal TEb, supply the track driving signal to the galvano mirror 56, and tracking control the galvano mirror 56 so as to reduce the difference in the tracking direction between the focus Fb of the reference light Lb1 and the focus of the signal light Lb2. Moreover, the controller 150 may generate a tangential driving signal based on the tangential error signal NEb, supply the tangential driving signal to the galvano mirror 51, and tangentially control the galvano mirror 51 so as to reduce the difference in the tangential direction between the focus Fb of the reference light Lb1 and the focus of the signal light Lb2.

Thus, the signal light optical system 50 may irradiate the signal light Lb2 on the holographic data storage medium 10, receive the reflective signal light Lb4 that is reflected from the reflective transmission layer 12, and supply the result of light-receiving to the signal processing unit (not shown). The controller 150 may perform focusing control of the actuating lens 60 of the beam expander 58 and may perform tangential and tracking control of the galvano mirrors 51 and 56 so as to coincide the focus of the signal light Lb2 with the focus Fb of the reference light Lb1.

Figure 9A:
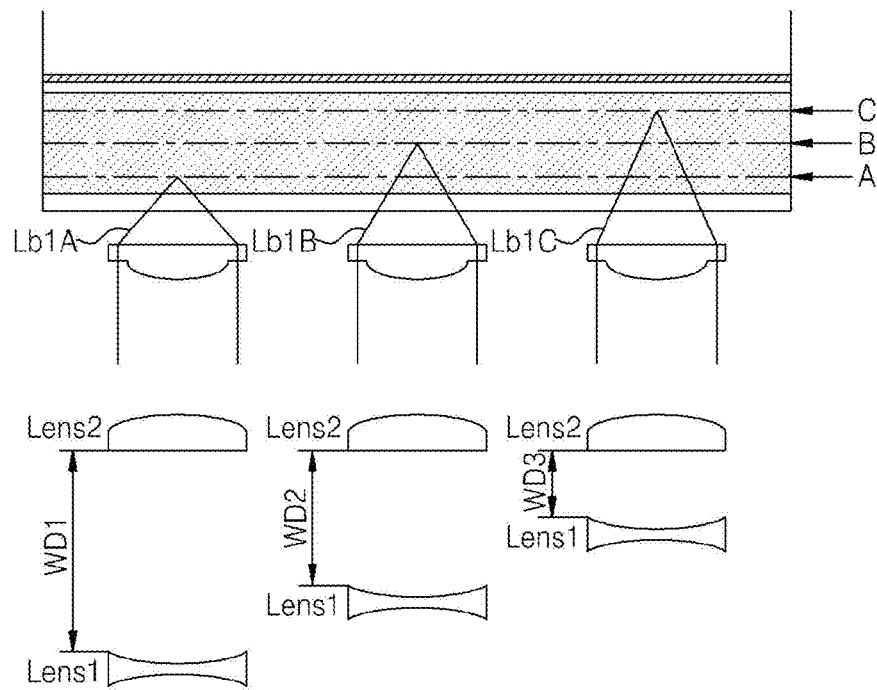
FIG. 9A is a diagram to explain an operation of moving a focus of a reference light by operating a reference light focus movement unit, according to an embodiment of the present invention.

FIG. 9A is a diagram to explain an operation of moving the focus of the reference light Lb1 by operating a reference light focus movement unit, according to an embodiment of the present invention. Referring to FIG. 9A, the reference light focus movement unit corresponds to the beam expander 32 of the apparatus to record and/or reproduce holographic data illustrated in FIG. 3. Specifically, as the actuating lenses 33 and 34 of the beam expander 32 are moved, the focus of the reference light Lb1 may be moved. The actuating lens 33 may be moved in the direction of the optical axis by using a stepping motor or piezo motor and moves the focus of the reference light Lb1 close to a target position. The actuating lens 33 is moved in order to coarsely control the focal position of the reference light. The actuating lens 34 may be moved in the direction of the optical axis by using an actuator that is similar to the driving unit 44 for the objective lens 100 and may control the focal position of the reference light finely.

The leftmost portion of FIG. 9A shows that a distance difference between the actuating lenses 33 and 34 is WD1. In this case, the focus of the reference light Lb1 is focused on A. The reference light Lb1 is not reflected from the reflective layer 11 but is focused directly on a recording layer. The middle portion of FIG. 9A shows that a distance difference between the actuating lenses 33 and 34 is WD2. As compared to the leftmost portion of FIG. 9A, a distance between the actuating lenses 33 and 34 becomes smaller. In this case, the focal position of the reference light Lb1 is moved from A to B. In other words, the focal position of the reference light Lb1 is moved to the reflective layer 11. The rightmost portion of FIG. 9A shows that a distance difference between the actuating lenses 33 and 34 is WD3. As compared to the middle portion of FIG. 9A, the distance between the actuating lenses 33 and 34 becomes smaller. In this case, the focal position of the reference light Lb1 is moved from B to C.

Figure 9B:
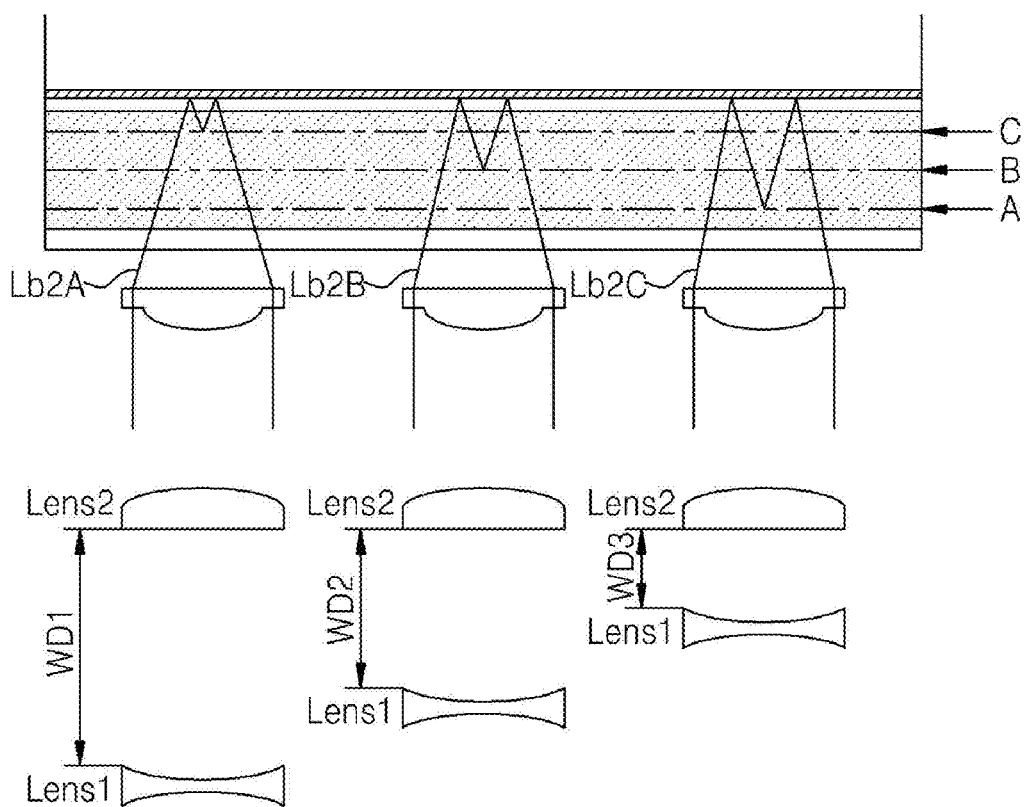
FIG. 9B is a diagram to explain an operation of moving the focus of the signal light by operating a signal light focus movement unit, according to an embodiment of the present invention.

FIG. 9B is a diagram to explain an operation of moving the focus of the signal light Lb2 by operating a signal light focus movement unit, according to an embodiment of the present invention. Referring to FIG. 9B, the signal light focus movement unit corresponds to the beam expander 58 of the apparatus to record and/or reproduce holographic data illustrated in FIG. 3. Specifically, as the actuating lenses 59 and 60 of the beam expander 58 are moved, the focus of the signal light Lb2 may be moved. The actuating lens 59 is moved in order to move the focus of the signal light Lb2 to be close to or coincide with the focal position of the reference light Lb1. The actuating lens 59 performs coarse control of the focal position of the signal light Lb2, and the actuating lens 60 performs fine control of the focal position of the signal light Lb2 so that the focus of the signal light Lb2 coincides with the focus of the reference light Lb1.

The leftmost portion of FIG. 9B shows that a distance difference between the actuating lenses 59 and 60 is WD1. In this case, the focus of the signal light Lb2 is focused on C. That is, the signal light Lb2 is reflected from the reflective layer 11 and then is focused on the recording layer. The middle portion of FIG. 9B shows that a distance difference between the actuating lenses 59 and 60 is WD2. As compared to the leftmost portion of FIG. 9B, a distance between the actuating lenses 59 and 60 becomes smaller. In this case, the focal position of the signal light Lb2 is moved from A to B. In other words, the focal position of the signal light is moved to be far away from the reflective layer 11. The rightmost portion of FIG. 9B shows that a distance difference between the actuating lenses 59 and 60 is WD3. As compared to the middle portion of FIG. 9B, a distance between the actuating lenses 59 and 60 becomes smaller. In this case, the focal position of the signal light Lb2 is moved from B to C. In other words, the focal position of the signal light is moved to be even farther away from the reflective layer 11

In FIGS. 9A and 9B, the actuating lenses 33 and 34 and 59 and 60 have been used as the reference light focus movement unit and the signal light focus movement unit, respectively. However, it is understood that aspects of the present invention are not limited thereto. For example, according to other aspects, the focus movement unit may not include actuating lenses, and/or any unit to move the focus of the reference light Lb1 or the signal light Lb2 may be used.

Figure 10:
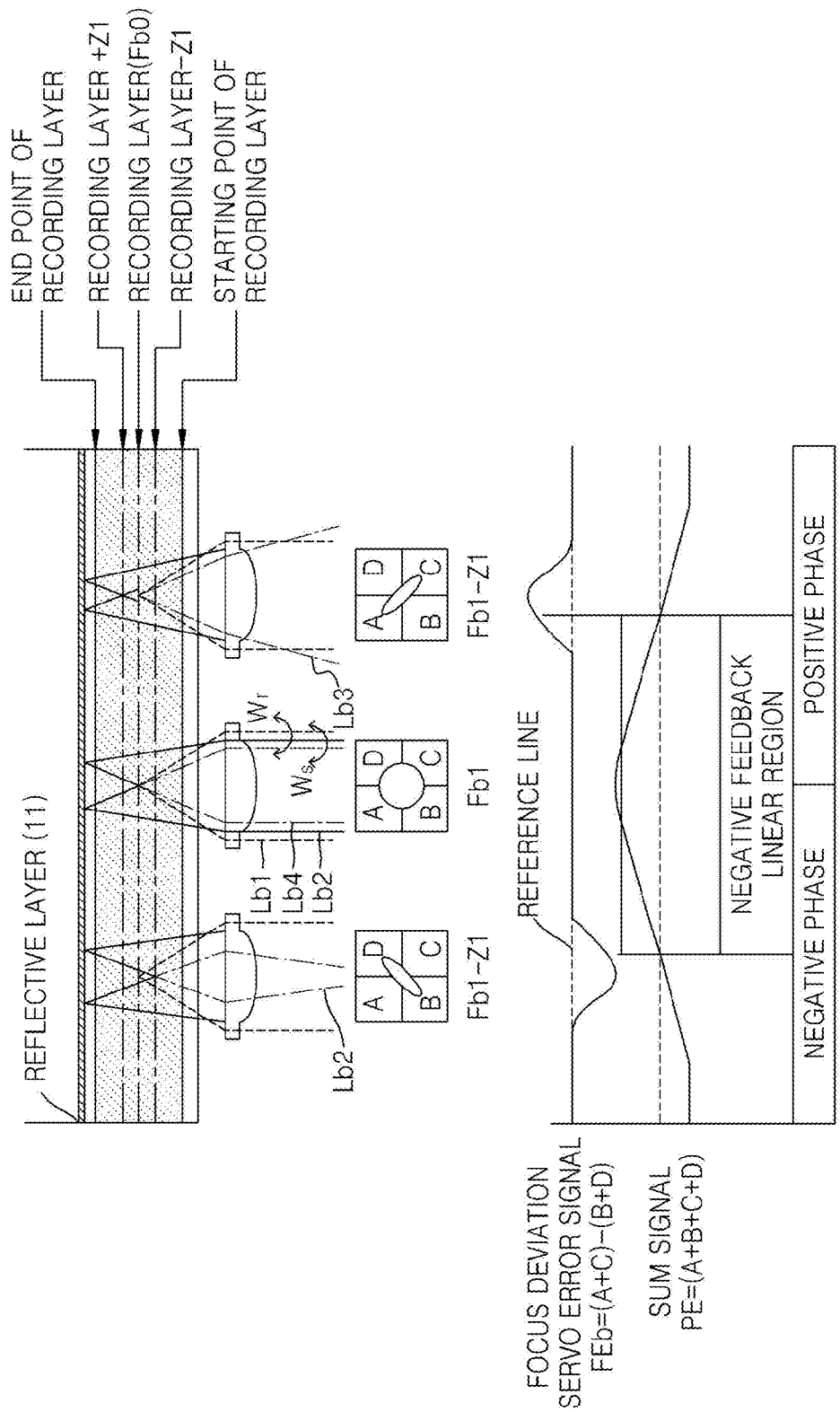
FIG. 10 is a diagram to explain an operation of a second photodetector of the apparatus to record and/or reproduce holographic data illustrated in FIG. 3, according to an embodiment of the present invention.

FIG. 10 is a diagram to explain an operation of the second photodetector 48 of the apparatus to record and/or reproduce holographic data illustrated in FIG. 3, according to an embodiment of the present invention. Referring to FIG. 10, the second photodetector 48 detects a reflective signal light that is generated when the signal light is reflected from the reflective layer 11. The second photodetector 48 includes four light-receiving regions, designated as A, B, C, and D.

The leftmost portion of FIG. 10 shows that a relatively large amount of light is detected from the light-receiving regions B and D of the second photodetector 48. A signal generator 1230 (to be described later with reference to FIG. 12) generates a focus error signal that indicates a distance difference between the focus of the reference light Lb1 and the focus of the signal light Lb2 based on the reflective signal light detected by the second photodetector 48. The focus error signal may be a focus error signal FEb or a sum signal PEb. However, it is understood that the focus error signal is not limited thereto, and any signal that indicates a distance difference between the focus of the reference light Lb1 and the focus of the signal light Lb2 can be used. The focus error signal FEb of FIG. 10 indicates a distance difference between the focus of the reference light Lb1 and the focus of the signal light Lb2 in the focusing direction and may be calculated by using Equation 3 above.

Referring to the leftmost portion of FIG. 10, the focus of the reference light Lb1 is positioned on a recording layer Fb0, and the focus of the signal light Lb2 is farther away from the reflective layer 11 than the recording layer Fb0. In this case, the focus error signal FEb is positioned below a reference line. Such a case where the focus error signal FEb exists below the reference line (for example, FEb=0) is referred to as a negative phase. Referring to the middle portion of FIG. 10, the focus of the signal light LB2 is moved to the reflective layer 11 so that the focus of the reference light Lb1 and the focus of the signal light Lb2 coincide with each other. In this case, an equivalent amount of light is detected from the four light-receiving regions of the second photodetector 48. According to Equation 3, the focus error signal FEb has a value of 0, and the sum signal PEb has a maximum value. Referring to the rightmost portion of FIG. 10, the focus of the signal light Lb2 is further moved to the reflective layer 11 so that the focus of the reference light Lb1 and the focus of the signal light Lb2 do not coincide with each other. In this case, the focus error signal FEb exists above the reference line. Such a case where the focus error signal FEb exists above the reference line is referred to as a positive phase.

When the focus of the signal light Lb2 is moved in the focusing direction and the focus error signal FEb is observed as described above, the focus error signal FEb has an S-shaped curve according to the focal position of the signal light Lb2. In the S-shaped curve, a linear region is a section in which a distance difference between the focus of the reference light Lb1 and the focus of the signal light Lb2 is less than a threshold value. When the S-shaped curve corresponds to the linear region in each of the focusing direction, the tangential direction, and the tracking direction, the servo controller operates normally. In the present disclosure, the servo controller refers to a device that controls servos so that the focus of the signal light Lb2 automatically coincides with the focus of the reference light Lb1 in response to the focus error signal indicative of the distance difference between the focus of the signal light Lb2 and the focus of the reference light Lb1.

In order to determine how close the focus of the signal light Lb2 and the focus of the reference light Lb1 are to each other, the sum signal PEb may be used instead of the S-shaped curve indicating the focus error signal. When the sum signal PEb is greater than the threshold value, it may be determined that the focus of the signal light Lb2 and the focus of the reference light Lb1 are close to each other.

FIGS. 11A through 11D are signal diagrams to explain an operation of controlling a focal position of the signal light Lb2 in the apparatus to record and/or reproduce holographic data illustrated in FIG. 3, according to an embodiment of the present invention. Referring to FIGS. 11A through 11D, the focus of the signal light Lb2 is moved in the tangential direction and then the focus of the signal light Lb2 is moved in the focusing direction. However, it is understood that aspects of the present invention are not limited to this movement, and the focus of the signal light Lb2 may be moved in various directions in other aspects. The focus of the signal light Lb2 may be first moved along a coordinate axis in which the linear region of the focus error signal is the largest, though aspects of the present invention are not limited thereto.

The focus movement unit coarsely moves the focus of the signal light Lb2 close to the focus of the reference light Lb1. For example, the focus of the signal light Lb2 may be coarsely moved close to the focus of the reference light Lb1 by using the actuating lens 59 of FIG. 3. A reference focus position of the signal light Lb2 to be coarsely moved and/or the position of the actuating lens 59 may be stored in a memory. Accordingly, the focus of the signal light Lb2 may be moved by using information about the reference focus position of the signal light Lb2 and/or the position of the actuating lens 59 stored in the memory.

After the focus of the signal light Lb2 has been coarsely moved, the controller 150 moves the focus of the signal light Lb2 in a tracking direction based on a tracking error signal TEb that indicates a difference between the focus of the signal light Lb2 and the focus of the reference light Lb1 in the tracking direction. For example, the controller 150 may move the focus of the signal light Lb2 in the tracking direction by changing the amplitude of a driving signal of the galvano mirror 56. As the focus of the signal light Lb2 is moved, the amount of reflective signal light received by the second photodetector 48 and a light-receiving region in which the reflective signal light is received change so that the tracking error signal TEb changes.

The tracking error signal is changed in the S-shaped curve as the amplitude of the driving signal increases or decreases. When the tracking error signal is positioned in the linear region of the S-shaped curve, the distance difference between the focus of the signal light Lb2 and the focus of the reference light Lb1 in the tracking direction is less than a threshold value. Thus, the controller 150 controls the driving signal of the galvano mirror 56 so that the tracking error signal is positioned in the linear region of the S-shaped curve.

In addition, the controller 150 moves the focus of the signal light in the tangential direction based on the tangential error signal NEb that indicates a distance difference between the focus of the signal light Lb2 and the focus of the reference light Lb1 in the tangential direction. For example, the focus of the signal light Lb2 may be moved in the tangential direction by changing the amplitude of a driving signal of the galvano mirror 51. The controller 150 searches for the linear region of the tangential error signal NEb by increasing or decreasing the amplitude of the driving signal of the galvano mirror 51, and controls the driving signal of the galvano mirror 51 so that the tangential error signal NEb is positioned in the linear region.

Similarly, the controller 150 moves the focus of the signal light Lb2 in the focusing direction based on the focus error signal FEb that indicates a distance difference between the focus of the signal light Lb2 and the focus of the reference light Lb1 in the focusing direction. For example, the focus of the signal light Lb 2 may be moved in the focusing direction by changing the amplitude of a driving signal of the actuating lens 60. The controller 150 searches for the linear region of the focus error signal FEb by increasing or decreasing the amplitude of the driving signal of the actuating lens 60, and controls the driving signal of the actuating lens 60 so that the focus error signal is positioned in the linear region.

An example of an operation through which the controller 150 searches for the linear region of the focus error signal FEb in each direction and controls the driving signal of the actuating lens 60 so that the focus error signal FEb is positioned in its linear region will now be described with reference to FIGS. 11A through 11D.

Figure 11A:
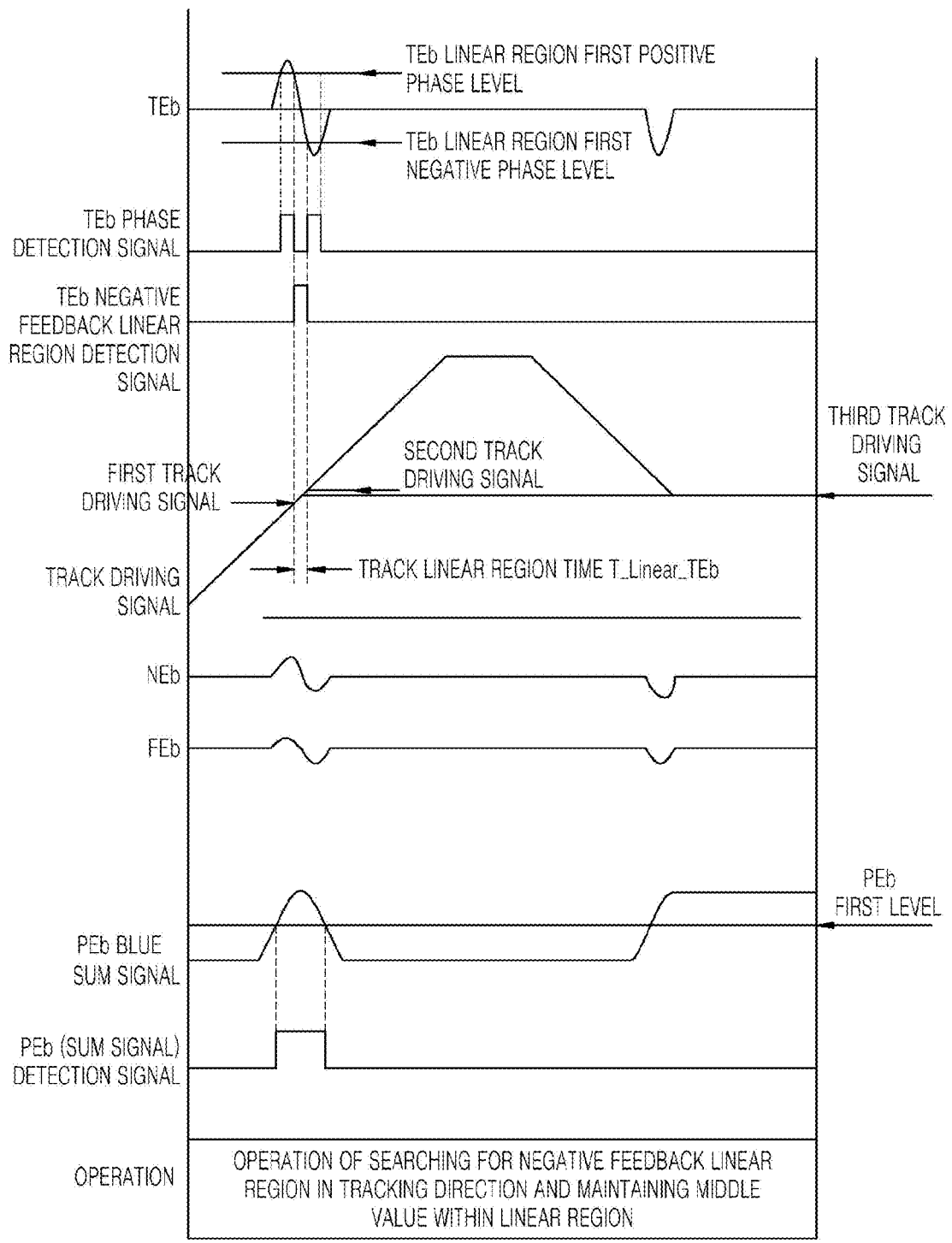
FIGS. 11A through 11D are signal diagrams to explain an operation of controlling a focal position of the signal light in the apparatus to record and/or reproduce holographic data illustrated in FIG. 3, according to an embodiment of the present invention.

FIG. 11A illustrates an operation of moving the focal position of the signal light Lb2 in the tracking direction based on the tracking error signal TEb, according to an embodiment of the present invention. Referring to FIG. 11A, when the controller 150 increases the amplitude of a driving signal (hereinafter, a track driving signal) supplied to the galvano mirror 56, the tracking error signal TEb is detected. This is because the focus of the signal light Lb2 is close to the focus of the reference light Lb1, and the reflective signal light is detected by the second photodetector 48.

When the controller 150 increases the amplitude of the track driving signal continuously, the amplitude of the tracking error signal TEb and the amplitude of the sum signal PEb increase. This is because the amount of the reflective signal light that is detected by the second photodetector 48 increases, but the reflective signal light is detected in a portion of the light-receiving regions A, B, C, and D.

When the controller 150 continues to increase the amplitude of the track driving signal continuously, an amplitude of the tracking error signal TEb decreases and the amplitude of the sum signal PEb increases. This is because the amount of the reflective signal light that is detected by the second photodetector 48 increases and the reflective signal light is uniformly detected in all of the light-receiving regions A, B, C, and D.

When the sum signal PEb exceeds a predetermined threshold value or the amplitude of the sum signal PEb increases but an amplitude of the tracking error signal TEb decreases, it may be deemed that the tracking error signal TEb enters a "negative feedback linear region." The tracking error signal TEb positioned in the "negative feedback linear region" indicates that the focus of the reference light Lb1 and the focus of the signal light Lb2 are considerably close to each other in the tracking direction. In this way, a level at a time point that the tracking error signal TEb exists on the reference line (for example, 0) and enters the "negative feedback linear region" is referred to as a first positive phase level, and a track driving signal in this case is referred to as a first track driving signal.

When the controller 150 continues to increase an amplitude of the track driving signal, a section in which an amplitude of the tracking error signal TEb decreases and an amplitude of the sum signal PEb increases continues. At a certain point, the amplitude of the tracking error signal TEb and the amplitude of the sum signal PEb decrease together. From this time, the tracking error signal TEb has a negative value. This is because the focal position of the reference light Lb1 and the focal position of the signal light Lb2 become far away from each other.

When the controller 150 continues to increase the amplitude of the track driving signal, the amplitude of the tracking error signal TEb increases but the amplitude of the sum signal PE decreases. At a certain point, the amplitude of the sum signal PEb becomes smaller than a predetermined threshold value. When the amplitude of the sum signal PEb is less than the predetermined threshold value, it may be deemed that the tracking error signal TEb deviates from the "negative feedback linear region." In this way, a level at a time point that the tracking error signal TEb exists below the reference line and first deviates from the "negative feedback linear region" is referred to as a first negative phase level. A track driving signal in this case is referred to as a second track driving signal.

When the controller 150 continues to increase the amplitude of the track driving signal, the focal position of the reference light Lb1 and the focal position of the signal light Lb2 are far away from each other, the reflective signal light is not detected by the second photodetector 48, and the tracking error signal becomes 0.

When the first positive phase level and the first negative phase level are detected by using the above-described method, the controller 150 maintains the track driving signal at a middle value of a first track driving signal and a second track driving signal.

Figure 11B:
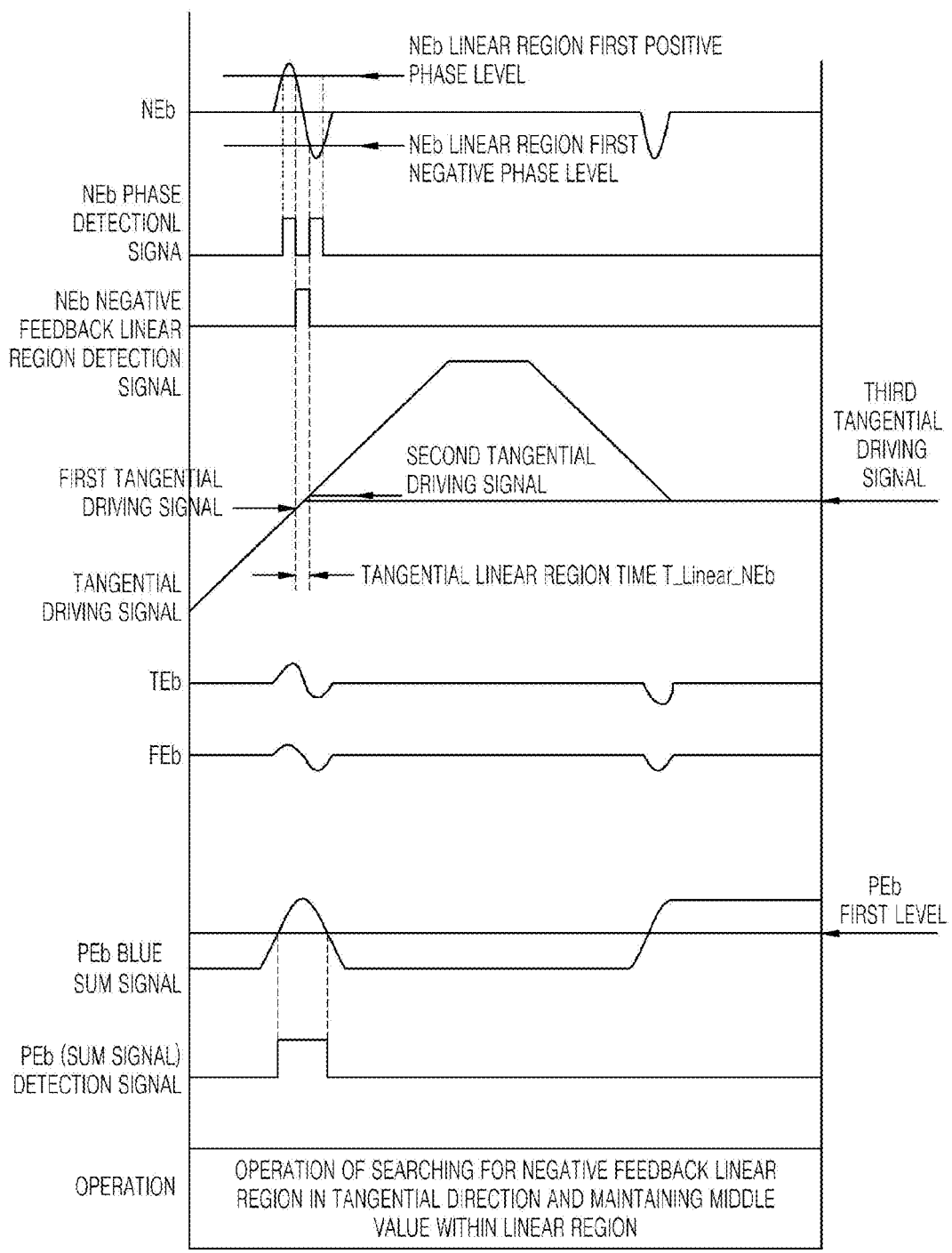

Referring to FIG. 11B, the controller 150 searches for the "negative feedback linear region" of the tangential error signal NEb in a similar manner to FIG. 11A. When the controller 150 searches for the "negative feedback linear region" of the tangential error signal NEb, the track driving signal may be maintained at the middle value of the first track driving signal and the second track driving signal.

Specifically, the controller 150 searches for a first tangential driving signal that is generated when the tangential error signal NEb enters the "negative feedback linear region" and a second tangential driving signal that is generated when the tangential error signal NEb deviates from the "negative feedback linear region." Subsequently, the controller 150 maintains the tangential error signal NEb at a middle value of the first tangential driving signal and the second tangential driving signal.

Figure 11C:
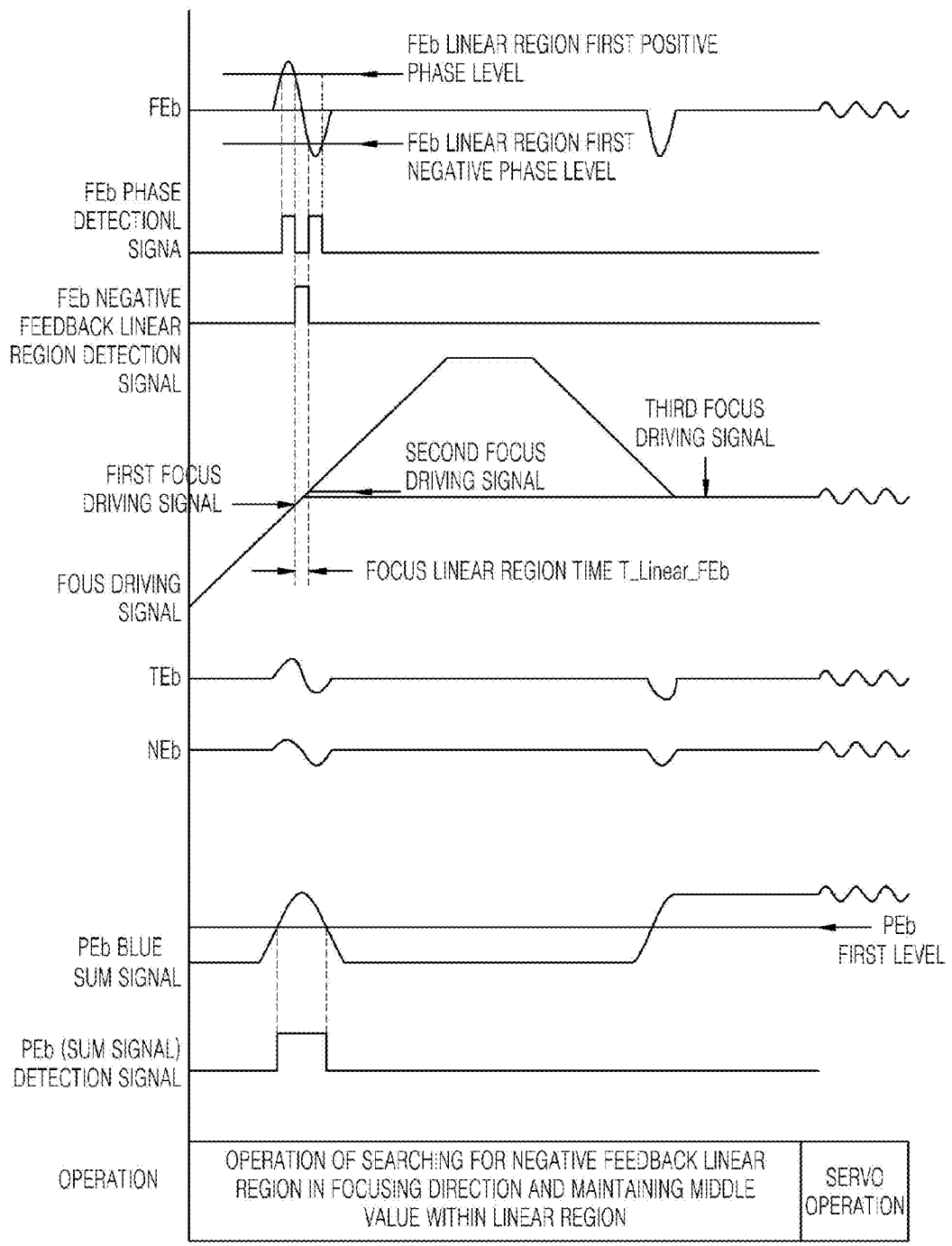

Referring to FIG. 11C, the controller 150 searches for the "negative feedback linear region" of the focus error signal FEb in a similar manner to FIG. 11A. When the controller 150 searches for the "negative feedback linear region" of the focus error signal FEb, the track driving signal may be maintained at the middle value of the first track driving signal and the second track driving signal, and the tangential driving signal may be maintained at the middle value of the first tangential driving signal and the second tangential driving signal.

Specifically, the controller 150 searches for a first focus driving signal that is generated when the focus error signal FEb enters the "negative feedback linear region" and a second focus driving signal that is generated when the focus error signal FEb deviates from the "negative feedback linear region." Subsequently, the controller 150 maintains the focus driving signal at a middle value of the first focus driving signal and the second focus driving signal.

Figure 11D:
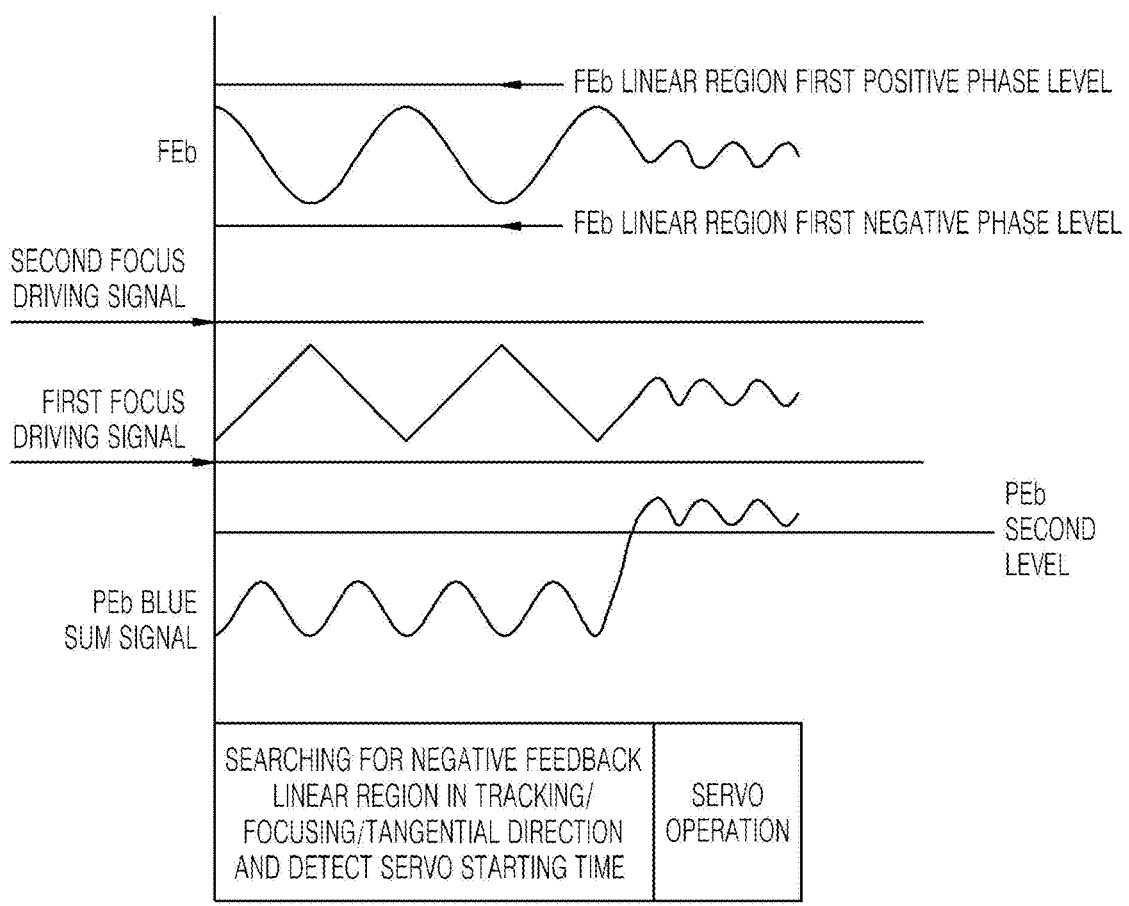

Referring to FIG. 11D, the controller 150 determines whether a distance difference between the focus of the reference light Lb1 and the focus of the signal light Lb2 is less than a threshold value used to drive the servo controller. The servo controller automatically controls servos in response to the focus error signal FEb so that the focus of the reference light Lb1 and the focus of the signal light Lb2 coincide with each other. In FIGS. 11A through 11C, the negative feedback linear region of the focus error signal FEb in each direction is searched for. However, since the focus error signal FEb may deviate from the negative feedback linear region due to tilt or vibration, it is determined whether a distance between the focus of the reference light Lb1 and the focus of the signal light Lb2 is less than the threshold value, before the servo controller operates.

The controller 150 may determine whether the distance between the focus of the reference light Lb1 and the focus of the signal light Lb2 is less than the threshold value in various ways. For example, the controller 150 may determine whether the distance between the focus of the reference light Lb1 and the focus of the signal light Lb2 is less than the threshold value, by using the sum signal PEb of the reflective signal light. Referring to FIG. 11D, the controller 150 observes the sum signal PEb of the reflective signal light after applying the track driving signal, the tangential driving signal, and the focus driving signal, according to the driving signals defined in FIGS. 11A through 11C. When the sum signal PEb exceeds the threshold value, the controller 150 determines that the focus of the reference light Lb1 and the focus of the signal light Lb2 are sufficiently close to each other so that the servo controller can be driven. However, when the sum signal PEb does not exceed the threshold value, the controller 150 determines which one of focus error signals deviates from the "negative feedback linear region," and performs at least one of the operations of FIGS. 11A through 11C again. Since the sum signal PEb exceeds the threshold value in FIG. 11D, the controller 150 drives the servo controller.

For example, the controller 150 determines whether each of the tracking error signal, the tangential error signal, and the focus error signal is positioned in the "negative feedback linear region." In FIG. 11D, the controller 150 determines whether the focus error signal is positioned in the "negative feedback linear region." The controller 150 observes the focus error signal while changing the focus driving signal between the first focus driving signal and the second focus driving signal. Referring to FIG. 11D, the focus error signal is positioned between the first positive phase level and the first negative phase level. Thus, the focus error signal is still positioned in the "negative feedback linear region." In this way, the controller 150 checks whether the tracking error signal TEb and the tangential error signal NEb are positioned in the "negative feedback linear region." If it is determined that all of the focus error signals in each direction are positioned in the "negative feedback linear region," the servo controller is driven.

In addition, the controller 150 simultaneously determines whether the sum signal and the focus error signals in each direction are positioned in the "negative feedback linear region," thereby determining whether the servo controller is driven.

Figure 12:
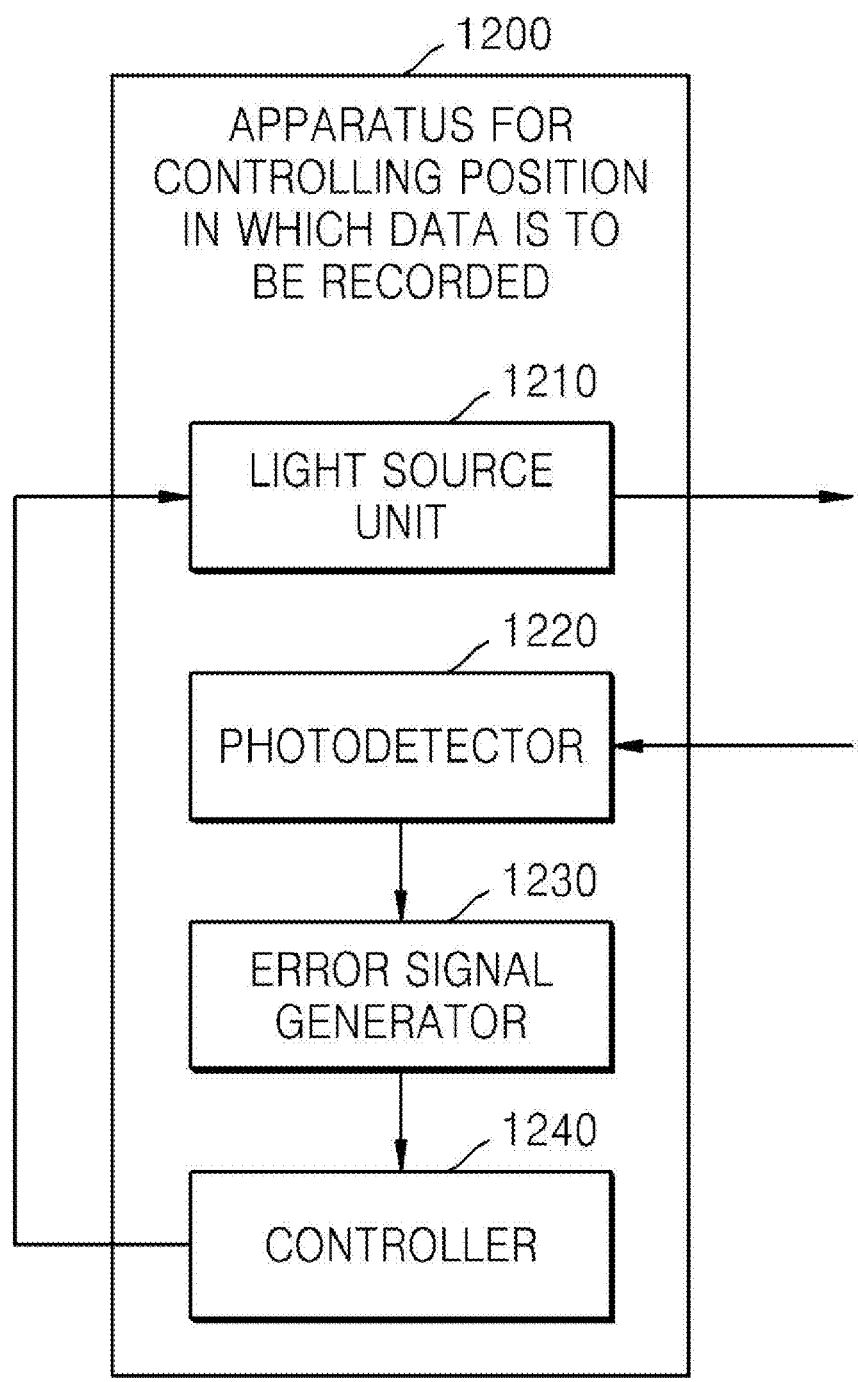
FIG. 12 is a block diagram of an apparatus to control a position in which data is to be recorded on a holographic data recording medium, according to an embodiment of the present invention.

FIG. 12 is a block diagram of an apparatus 1200 to control a position in which data is to be recorded on a holographic data recording medium, according to an embodiment of the present invention. The holographic data recording medium may include a first substrate, a first reflective layer from which a first light having a first wavelength is reflected, a second reflective layer from which a second light having a second wavelength is reflected, and a recording layer on which the data is recorded. The second reflective layer may be adjacent to the recording layer, and the first reflective layer may be closer to or father away from a portion on which light is incident, than the second reflective layer. In addition, whichever of the first and second reflective layers that are closer to the portion on which light is incident, may be a reflective transmission layer through which light having one wavelength of the first and second wavelengths is transmitted and from which light having the other wavelength is reflected. Hereinafter, the first reflective layer is provided as an example of the reflective transmission layer.

In FIG. 12, for convenience of explanation, it is assumed that the first light is a servo light having a red wavelength and the second light is a reference light or signal light having a blue wavelength. The servo light is used to search for an address in which data is to be recorded, in the holographic data recording medium. The signal light is used to record data. Specifically, a hologram that is generated due to interference between the signal light and the reference light is recorded on the recording layer. The reference light is used to record data together with the signal light and is used to reproduce data separately from the signal light. In addition, it is assumed that the first reflective layer is the reflective transmission layer that is closer to the portion on which light is incident than the second reflective layer.

Hereinafter, an operation of moving the focus of the signal light to the focus of the reference light in the state where the focus of the servo light and the focus of the reference light are positioned in a target position will be described. Referring to FIG. 12, the apparatus 1200 to control a position in which data is to be recorded on a holographic data recording medium includes a light source unit 1210, a photodetector 1220, an error signal generator 1230, and a controller 1240. While not required, the controller 1240 can be one or more processors or processing elements on one or more chips or integrated circuits.

The light source unit 1210 irradiates the reference light and the signal light on the holographic data recording medium. When the irradiated reference light and signal light interfere with each other, a hologram mark is generated in a recording layer of the holographic data recording medium. The reference light and the signal light have the same wavelength and may be perpendicularly polarized light. For example, the reference light may be left circular polarized and the signal light may be right circular polarized, or vice versa. One of the reference light and the signal light is reflected from the reflective transmission layer and is focused on the recording layer, and the other one is focused directly on the recording layer. Hereinafter, it is assumed that the reference light is focused directly on the recording layer and the signal light is reflected from the reflective transmission layer and is focused on the recording layer, though aspects of the present invention are not limited thereto.

The photodetector 1220 detects a reflective signal light that is generated when the signal light is reflected from the reflective transmission layer. The photodetector 1220 may include at least one light-receiving region so as to generate a focus error signal that will be described later.

The error signal generator 1230 generates a focus error signal that indicates a distance difference between a first focus (i.e., a focus of the reference light) and a second focus (i.e., a focus of the signal light). The focus error signal may include a first focus error signal that indicates a distance difference between the first focus and the second focus in a direction of a first coordinate axis, a second focus error signal that indicates a distance difference between the first focus and the second focus in a direction of a second coordinate axis, and a third focus error signal that indicates a distance between the first focus and the second focus in a direction of a third coordinate axis. Here, the first coordinate axis, the second coordinate axis, and the third coordinate axis are coordinate axes of a three-dimensional (3D) space. For example, the first coordinate axis, the second coordinate axis, and the third coordinate axis may be an x-axis, a y-axis, and a z-axis, respectively, used in rectangular coordinates, a $\rho$-axis, a $\theta$-axis, and a z-axis, respectively, used in a cylindrical coordinate system, or $\Sigma$-axis, a $\theta$-axis, and a $\phi$-axis, respectively, used in a spherical coordinate system.

Hereinafter, by way of example, a coordinate axis that indicates a focusing direction corresponding to a thickness direction of the holographic data recording medium is referred to as a first coordinate axis. Also, a coordinate axis that indicates a tracking direction corresponding to a radial direction of the holographic data recording medium is referred to as a second coordinate axis. Furthermore, a coordinate axis that indicates a tangential direction of the holographic data recording medium is referred to as a third coordinate axis.

The controller 1240 controls the apparatus 1200 so that the second focus is moved to a position in which the first focus is formed, based on the focus error signal. Specifically, the controller 1240 controls the apparatus 1200 so that the focus error signal is positioned in its linear region in each direction based on the focus error signal. In other words, the controller 1240 controls the apparatus 1200 so that the tracking error signal, the tangential error signal, and the focus error signal are positioned in their linear regions, respectively.

The apparatus 1200 includes a first focus movement unit (not shown) that moves the second focus along the first coordinate axis, a second focus movement unit (not shown) that moves the second focus along the second coordinate axis, and/or a third focus movement unit (not shown) that moves the third focus along the third coordinate axis. The controller 1240 controls an operation of the first focus movement unit, the second focus movement unit, and/or the third focus movement unit, thereby moving the second focus.

The apparatus 1200 may further include a servo controller (not shown) to automatically control servos in response to the focus error signal so that the second focus coincides with the first focus.

The controller 1240 may include a determination unit (not shown) to determine whether a distance difference between the first focus and the second focus is less than a threshold value. The controller 1240 may further include an operation starting unit (not shown) to control the apparatus 1200 so that the servo controller is driven if the distance difference between the first focus and the second focus is determined by the determination unit to be less than the threshold value. In addition, the controller 1240 may control the apparatus 1200 so that a position of the second focus is stored in a memory, if the distance difference between the first focus and the second focus is determined by the determination unit to be less than the threshold value. According to another embodiment, the controller 1240 may control the apparatus 1200 so that the position of the first focus movement unit, the second focus movement unit, and the third focus movement unit and/or an amplitude of a driving voltage (or current) used to drive the first focus movement unit, the second focus movement unit, and the third focus movement unit is recorded in the memory, if the distance difference between the first focus and the second focus is determined by the determination unit to be less than the threshold value.

For example, the determination unit may determine whether the distance difference between the first focus and the second focus in each direction of a coordinate axis is less than the threshold value. To this end, the determination unit may include a first determination unit (not shown) to determine whether the distance difference between the first focus and the second focus with respect to the first coordinate axis is less than a first threshold value, a second determination unit (not shown) to determine whether the distance difference between the first focus and the second focus with respect to the second coordinate axis is less than a second threshold value, and a third determination unit (not shown) to determine whether the distance difference between the first focus and the second focus with respect to the third coordinate axis is less than a third threshold value. As another example, the determination unit may further include a fourth determination unit to determine whether the amplitude of the received signal reflective light is above a predetermined threshold.

An operation of the apparatus 1200 illustrated in FIG. 12 will now be described in a temporal order. Hereinafter, for convenience of explanation, the first focus error signal is a focus error signal, the second focus error signal is a tracking error signal, and the third focus error signal is a tangential error signal. In addition, the first focus movement unit is referred to as a focus focus movement unit, the second focus movement unit is referred to as a track focus movement unit, and the third focus movement unit is referred to as a tangential focus movement unit.

First, the focus of a servo light in the form of a red light is disposed in a target position. When the focus of the servo light is disposed in the target position, the light source unit 1210 emits a blue light. The blue light is divided into a signal light used to record data and a reference light used to reproduce and record data. The signal light and the reference light may be perpendicularly polarized light. For example, the signal light may be left circular polarized and the reference light may be right circular polarized, or vice versa.

When the blue light is emitted, the controller 1240 controls the apparatus 1200 so that the focus of the reference light is disposed in the target position. When the focus of the reference light is disposed in the target position, the controller 1240 controls the apparatus 1200 so that the focus of the signal light coincides with the focus of the reference light.

When the emitted signal light is reflected from the reflective layer, the photodetector 1220 detects the reflective signal light. The photodetector 1220 includes a plurality of light-receiving regions. The error signal generator 1230 generates a focus error signal based on the intensity of the reflective signal light detected from each of the light-receiving regions. In this case, the error signal generator 1230 generates a tracking error signal, a tangential error signal, and a focus error signal based on Equations 3 through 5, provided above.

The controller 1240 moves the second focus in a tracking direction based on the tracking error signal. Next, the second focus is moved in the tangential direction based on the tangential error signal while a coordinate in the tracking direction is fixed. Last, the second focus is moved in the focusing direction based on the focus error signal while the coordinate in the tracking direction and a coordinate in the tangential direction are fixed. Specifically, the controller 1240 searches for a "negative feedback linear region" of each of the tracking error signal, the tangential error signal, and the focus error signal. Accordingly, the controller 1240 controls the driving signal so that each of the tracking error signal, the tangential error signal, and the focus error signal is enabled within the "negative feedback linear region."

Next, the controller 1240 determines whether the distance difference between the first focus and the second focus is less than a threshold value. In order to determine whether the distance difference between the first focus and the second focus is less than the threshold value, the controller 1240 determines whether each of the tracking error signal, the tangential error signal, and the focus error signal is enabled within the "negative feedback linear region" or whether the sum signal PEb is above a threshold.

As a result of determination, if the distance difference between the first focus and the second focus is less than the threshold value, the controller 1240 drives the servo controller. Moreover, the controller 1240 controls the apparatus 1200 so that position information about the second focus and/or information about a driving signal that is used so that the second focus is disposed in the target position is recorded in the memory.

The servo controller automatically controls servos in response to the focus error signal so that the first focus and the second focus coincide with each other. Thus, after the servo controller operates, data may be recorded in the memory due to a modulated recording pulse applied. However, when the tracking error signal, the tangential error signal, or the focus error signal deviates from the "linear region" due to a disturbance (such as side vibration or eccentricity of a disk), the servo controller does not operate normally. In this case, the controller 1240 stops the operation of the servo controller and determines whether the focus error signal in a direction deviates from the "linear region."

In this case, the second focus is not moved in a direction in which the focus error signal does not deviate from the "linear region." For example, when only the tangential error signal deviates from the linear region, the second focus is moved in the tangential direction while a coordinate of the second focus in the tracking direction or focusing direction is fixed. In this case, the controller 1240 searches again for the linear region of the tangential error signal based on the tangential error signal, and generates a tangential driving signal again so that the tangential error signal is disposed in the linear region.

In the related art, when the focus of the signal light coincides with the focus of the reference light so as to start recording, the focus error signal deviates from the linear region due to interference. However, servos do not operate normally or are omitted so that data is not finely recorded. According to aspects of the present invention, the focus error signal is generated in each of the track, tangential, and focusing directions, and a linear region is searched for in each direction based on the focus error signal. The focus error signal in one direction is maintained in the linear region, and a linear region of the focus error signal in other directions is searched for so that interference can be minimized.

Figure 13:
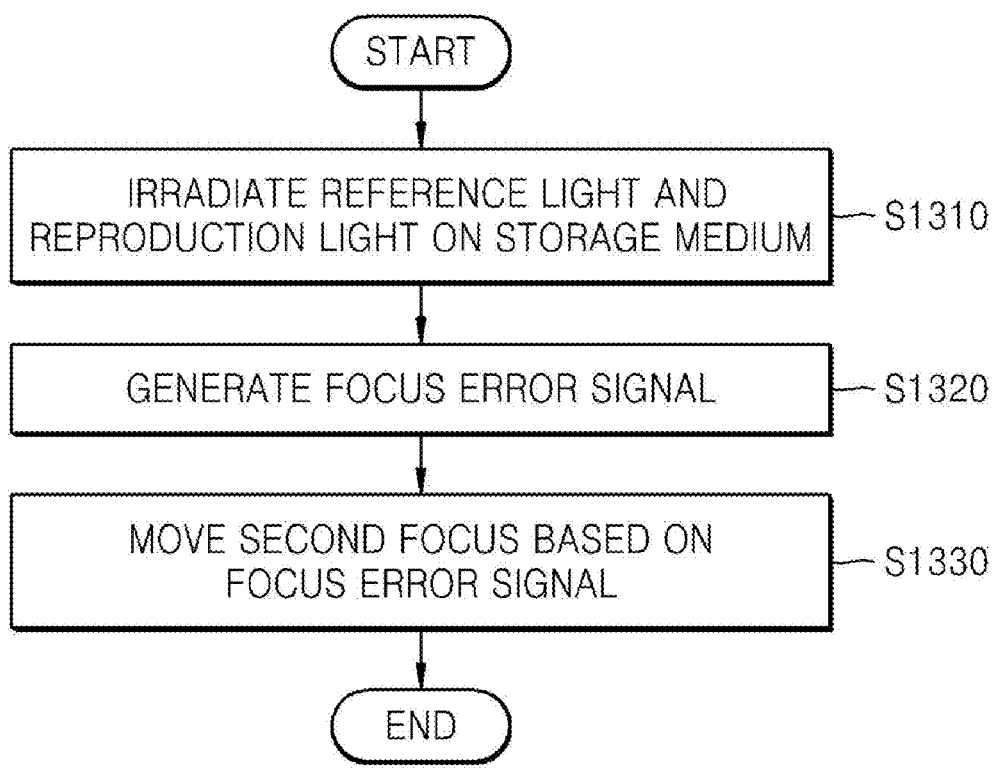
FIG. 13 is a flowchart illustrating a method of controlling a position in which data is to be recorded on the holographic data recording medium, according to an embodiment of the present invention.

FIG. 13 is a flowchart illustrating a method of controlling a position in which data is to be recorded on the holographic data recording medium 10, according to an embodiment of the present invention. Referring to FIG. 14, the reference light and the signal light are irradiated on the holographic data recording medium in operation S1310.

A focus error signal that indicates a distance difference between the first focus (i.e., a focus of the reference light) and the second focus (i.e., a focus of the signal light) is generated based on information about a reflective light that is reflected from the holographic data recording medium in operation S1320. The focus error signal includes a first focus error signal that indicates a distance difference between the first focus and the second focus with respect to the first coordinate axis, a second focus error signal that indicates a distance difference between the first focus and the second focus with respect to the second coordinate axis, and a third focus error signal that indicates a distance difference between the first focus and the second focus with respect to the third coordinate axis.

The second focus is moved to a position in which the first focus is formed, based on the focus error signal in operation S1330. Specifically, the second focus is moved along the first coordinate axis based on the first focus error signal. While the position on the first coordinate axis is fixed, the second focus is moved along the second coordinate axis based on the second focus error signal. Then, while the position on the first coordinate axis and the position on the second coordinate axis are fixed, the second focus is moved along the third coordinate axis.

Figure 14A:
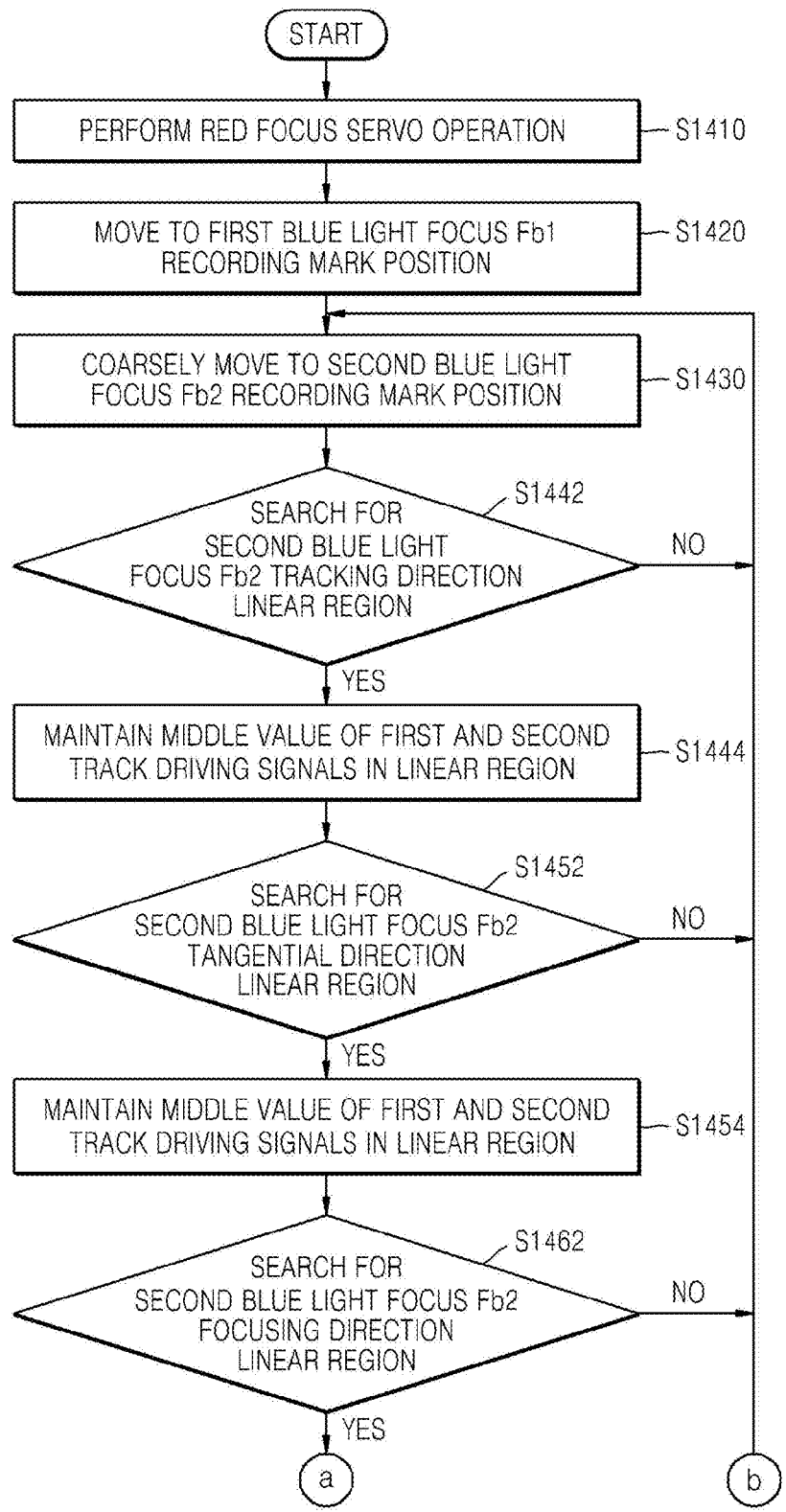
FIGS. 14A and 14B are flowcharts illustrating a method of controlling a position in which data is to be recorded on the holographic data recording medium, according to another embodiment of the present invention.
Figure 14B:
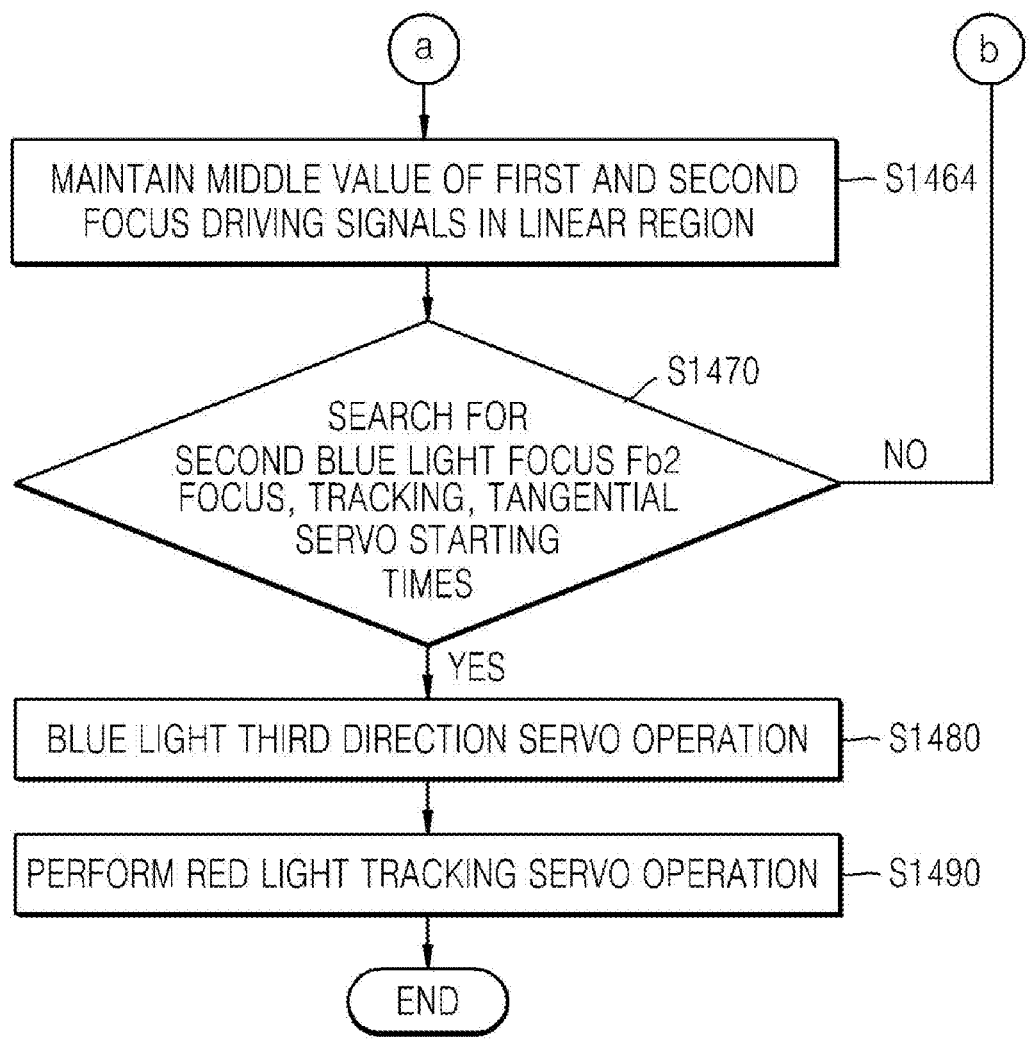

FIGS. 14A and 14B are flowcharts illustrating a method of controlling a position in which data is to be recorded on the holographic data recording medium 10, according to another embodiment of the present invention. Referring to FIGS. 14A and 14B, the focus of the servo light is moved to a desired position in the focusing direction in operation S1410. Moreover, the focus of the reference light is disposed in a target position in operation S1420. The focus of the signal light is moved to be close to the focus of the reference light in operation S1430.

A linear region of a tracking error signal is searched for in operation S1442. A track driving signal is adjusted so that the tracking error signal is disposed in the linear region in operation S1444. For example, the track driving signal may be set to a middle value of a first track driving signal when the tracking error signal enters the linear region and a second track driving signal when the tracking error signal deviates from the linear region.

A linear region of the tangential error signal is searched for in operation S1452. A tangential driving signal is adjusted so that the tangential driving signal is disposed in the linear region in operation S1454. For example, the tangential driving signal may be set to a middle value of a first tangential driving signal constituting a tangential driving signal when the tangential error signal enters the linear region and a second tangential driving signal constituting a tangential driving signal when the tangential error signal deviates from the linear region.

A linear region of the focus error signal is searched for in operation S1462. A focus driving signal is adjusted so that the focus driving signal is disposed in the linear region in operation S1464. For example, the focus driving signal is set to a middle value of a first focus driving signal constituting a focus driving signal when the focus error signal enters the linear region and a second focus driving signal constituting a focus driving signal when the focus error signal deviates from the linear region.

In operation S1470, it is determined whether the tangential error signal and the focus error signal are disposed in the linear region. Accordingly, when all of the focus error signals are determined to be disposed in the linear region (operation S1470), a servo operation of the signal light starts in operation S1480. In other words, the servo controller is driven. The focus of a red light is moved to a desired position in the tracking direction in operation S1490.

Figure 15B:
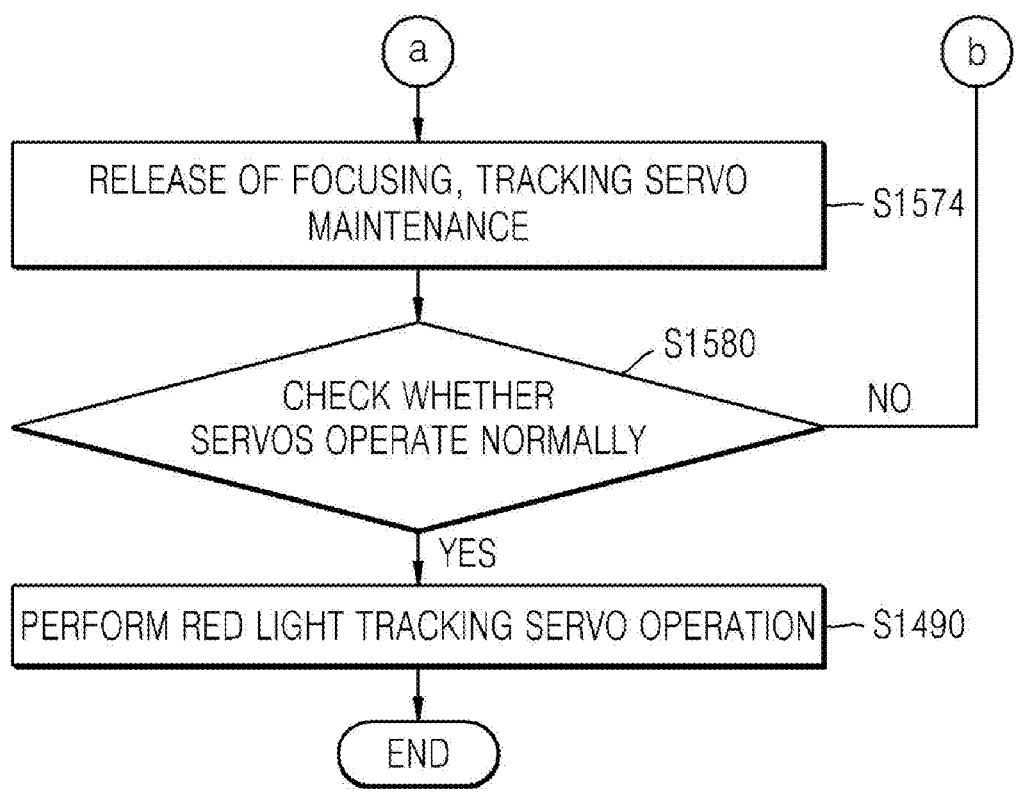

FIGS. 15A and 15B are flowcharts illustrating a method of controlling a position in which data is to be recorded on the holographic data recording medium 10, according to another embodiment of the present invention. In the method of FIGS. 14A and 14B, the linear region of each of the tracking error signal, the tangential error signal, and the focus error signal is searched for and then, a plurality of pieces of information about the linear regions may be recorded in a memory. FIGS. 15A and 15B are flowcharts illustrating the method of controlling the position in which data is to be recorded on the holographic data recording medium 10, when the information about the linear regions are obtained in this way and a servo re-entering operation is performed in each direction (i.e., the servo controller re-operates).

Referring to FIGS. 15A and 15B, the focus of the servo light is moved to a desired position in a focusing direction in operation S1510. The focus of the reference light is moved to a target position in operation S1520. The focus of the signal light is moved to be close to the focus of the reference light in operation S1530. A track driving signal, a tangential driving signal, and a focus driving signal are maintained at a middle value of linear regions based on the information about the linear regions that have been previously obtained in operation S1540.

Whether the focus error signal is enabled within the linear region is determined in operation S1552. If it is determined that the focus error signal is enabled within the linear region (operation S1552), the focus driving signal in operation S1540 is maintained in operation S1554.

Whether the tracking error signal is enabled within the linear region is determined in operation S1562. If it is determined that the tracking error signal is enabled within the linear region (operation S1562), the track driving signal in operation S1540 is maintained in operation S1564.

Whether the tangential error signal is enabled within the linear region is determined in operation S1572. If it is determined that the tangential error signal is enabled within the linear region (operation S1572), the tangential driving signal in operation S1440 is maintained in operation S1574.

Whether servos operate normally is checked in operation S1580. If the servos operate normally (operation S1580) the focus of a red light is moved to a desired position along the tracking direction in operation S1590.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a position in which data is to be recorded on a holographic data recording medium by using interference between a reference light and a signal light, the method comprising: transmitting a servo light through a reflective transmission layer of the holographic data recording medium; irradiating the reference light and the signal light on the holographic data recording medium; generating a focus error signal that indicates a distance difference between a first focus corresponding to a focus of the reference light on the holographic data recording medium and a second focus corresponding to a focus of the signal light on the holographic data recording medium, based on information about a reflective signal light generated when the irradiated signal light is reflected from the reflective transmission layer; moving the second focus to a position of the first focus, based on the generated focus error signal; determining whether the distance difference between the first focus and the moved second focus is less than a threshold value; and in response to the determined distance difference between the first focus and the moved second focus being less than the threshold value, driving a servo controller that automatically controls servos in response to the generated focus error signal so that the second focus coincides with the first focus.

2. The method as claimed in claim 1, wherein:
the focus error signal comprises a first focus error signal that indicates a distance difference between the first focus and the second focus in a direction of a first coordinate axis, a second focus error signal that indicates a distance difference between the first focus and the second focus in a direction of a second coordinate axis, or a third focus error signal that indicates a distance between the first focus and the second focus in a direction of a third coordinate axis; and
the first coordinate axis, the second coordinate axis, and the third coordinate axis are coordinate axes of a three-dimensional (3D) space.

3. The method as claimed in claim 2, wherein the moving of the second focus to the position of the first focus comprises:
moving the second focus along the first coordinate axis based on the first focus error signal;
moving the second focus along the second coordinate axis based on the second focus error signal while a position of the second focus on the first coordinate axis is fixed; and
moving the third focus along the third coordinate axis based on the third focus error signal while the position of the second focus on the first coordinate axis and a position of the second focus on the second coordinate axis are fixed.

4. A method of controlling a position in which data is to be recorded on a holographic data recording medium by using interference between a reference light and a signal light, the method comprising: irradiating the reference light and the signal light on the holographic data recording medium; generating a focus error signal that indicates a distance difference between a first focus corresponding to a focus of the reference light on the holographic data recording medium and a second focus corresponding to a focus of the signal light on the holographic data recording medium, based on information about a reflective signal light generated when the irradiated signal light is reflected from a reflective transmission layer of the holographic data recording medium; moving the second focus to a position of the first focus, based on the generated focus error signal; determining whether the distance difference between the first focus and the moved second focus is less than a threshold value; and in response to the determined distance difference between the first focus and the moved second focus being less than the threshold value, driving a servo controller that automatically controls servos in response to the generated focus error signal so that the second focus coincides with the first focus.

5. The method as claimed in claim 4, wherein the determining of whether the distance difference between the first focus and the moved second focus is less than the threshold value comprises:
determining whether the distance difference between the first focus and the second focus with respect to the first coordinate axis is less than a first threshold value;
determining whether the distance difference between the first focus and the second focus with respect to the second coordinate axis is less than a second threshold value; and
determining whether the distance difference between the first focus and the second focus with respect to the third coordinate axis is less than a third threshold value.

6. The method as claimed in claim 4, wherein the determining of whether the distance difference between the first focus and the second focus is less than the threshold value comprises determining whether an amplitude of the reflective signal light is greater than a predetermined threshold.

7. The method as claimed in claim 4, further comprising, in response to the determined distance difference between the first focus and the moved second focus being less than the threshold value, recording information about a position of the moved second focus in a storage space.

8. The method as claimed in claim 7, further comprising moving the second focus based on the recorded information about the position of the second focus when the servo controller is re-driven.

9. The method as claimed in claim 1, wherein:
the holographic data recording medium comprises a substrate, a reflective layer from which a servo light used to control a data recording or reproducing position is reflected, the reflective transmission layer from which the irradiated signal light is reflected, and a recording layer on which the data is recorded;
the reflective transmission layer is adjacent to the recording layer and is closer to a portion of the recording layer on which the irradiated reference light is incident than the reflective layer;
the servo light is transmitted through the reflective transmission layer; and
the signal light is reflected from the reflective transmission layer.

10. A method of controlling a position in which data is to be recorded on a holographic data recording medium by using interference between a reference light and a signal light, the method comprising: irradiating the reference light and the signal light on the holographic data recording medium; generating a focus error signal that indicates a distance difference between a first focus corresponding to a focus of the reference light on the holographic data recording medium and a second focus corresponding to a focus of the signal light on the holographic data recording medium, based on information about a reflective signal light generated when the irradiated signal light is reflected from a reflective transmission layer of the holographic data recording medium; and moving the second focus to a position of the first focus, based on the generated focus error signal, wherein the moving of the second focus to the position of the first focus comprises changing an amplitude of a driving signal; determining whether the distance difference between the first focus and the moved second focus is less than a threshold value; and in response to the determined distance difference between the first focus and the moved second focus being less than the threshold value, driving a servo controller that automatically controls servos in response to the generated focus error signal so that the second focus coincides with the first focus.

11. The method as claimed in claim 10, wherein the changing of the amplitude of the driving signal comprises changing the amplitude of the driving signal until the generated focus error signal enters a negative feedback linear region.

12. The method as claimed in claim 3, wherein:
the first focus error signal is a tracking error signal;
the second focus error signal is a tangential error signal; and
the third focus error signal is a focus error signal.

13. An apparatus to control a position in which data is to be recorded on a holographic data recording medium by using interference between a reference light and a signal light, the apparatus comprising: a light source unit configured to transmit a servo light through a reflective transmission layer of the holographic data recording medium; a light source unit configured to irradiate the reference light and the signal light on the holographic data recording medium; a photodetector configured to detect a reflective signal light generated when the irradiated signal light is reflected from the reflective transmission layer; a focus error signal generator configured to generate a focus error signal that indicates a distance difference between a first focus corresponding to a focus of the reference light on the holographic data recording medium and a second focus corresponding to a focus of the signal light on the holographic data recording medium based on the detected reflective signal light; a controller configured to control a moving of the second focus to a position of the first focus, based on the generated focus error signal; a servo controller configured to automatically control servos in response to the generated focus error signal so that the second focus coincides with the first focus, wherein the controller is configured to determine whether the distance difference between the first focus and the moved second focus is less than a threshold value, and in response to the determined distance difference between the first focus and the moved second focus being less than the threshold value, to drive the servo controller.

14. The apparatus as claimed in claim 13, wherein:
the focus error signal comprises a first focus error signal that indicates a distance difference between the first focus and the second focus in a direction of a first coordinate axis, a second focus error signal that indicates a distance difference between the first focus and the second focus in a direction of a second coordinate axis, or a third focus error signal that indicates a distance between the first focus and the second focus in a direction of a third coordinate axis; and
the first coordinate axis, the second coordinate axis, and the third coordinate axis are coordinate axes of a three-dimensional (3D) space.

15. The apparatus as claimed in claim 14, further comprising:
a first focus movement unit configured to move the second focus along the first coordinate axis based on the first focus error signal;
a second focus movement unit configured to move the second focus along the second coordinate axis based on the second focus error signal while a position of the second focus on the first coordinate axis is fixed; and
a third focus movement unit configured to move the third focus along the third coordinate axis based on the third focus error signal while the position of the second focus on the first coordinate axis and a position of the second focus on the second coordinate axis are fixed,
wherein the controller controls an operation of the first focus movement unit, the second focus movement unit, or the third focus movement unit based on the first, second, and third focus error signals.

16. An apparatus to control a position in which data is to be recorded on a holographic data recording medium by using interference between a reference light and a signal light, the apparatus comprising:
a light source unit configured to irradiate the reference light and the signal light on the holographic data recording medium;
a photodetector configured to detect a reflective signal light generated when the irradiated signal light is reflected from a reflective transmission layer of the holographic data recording medium;
a focus error signal generator configured to generate a focus error signal that indicates a distance difference between a first focus corresponding to a focus of the reference light on the holographic data recording medium and a second focus corresponding to a focus of the signal light on the holographic data recording medium based on the detected reflective signal light, the reflective transmission layer being closer to a recording layer than a reflective layer;
a controller configured to control a moving of the second focus to a position of the first focus, based on the generated focus error signal; and a servo controller configured to automatically control servos in response to the generated focus error signal so that the second focus coincides with the first focus, wherein the controller comprises:

a determination unit configured to determine whether the distance difference between the first focus and the moved second focus is less than a threshold value; and an operation starting unit configured to drive the servo controller in response to the determined distance difference between the first focus and the moved second focus being less than the threshold value.

17. The apparatus as claimed in claim 16, wherein the determination unit comprises:

a first determination unit configured to determine whether the distance difference between the first focus and the second focus with respect to the first coordinate axis is less than a first threshold value;

a second determination unit configured to determine whether the distance difference between the first focus and the second focus with respect to the second coordinate axis is less than a second threshold value; and a third determination unit configured to determine whether the distance difference between the first focus and the second focus with respect to the third coordinate axis is less than a third threshold value.

18. The apparatus as claimed in claim 17, wherein the determination unit further comprises a fourth determination unit configured to determine whether an amplitude of the reflective signal light is greater than a predetermined threshold.

19. The apparatus as claimed in claim 16, wherein, in response to the determined distance difference between the first focus and the moved second focus being less than the threshold value, the controller controls a storing of information on a position of the moved second focus in a storage space.

20. The apparatus as claimed in claim 19, wherein the controller further controls a moving of the second focus based on the stored information about the position of the second focus when the servo controller is re-driven.

21. The apparatus as claimed in claim 13, wherein:

the holographic data recording medium comprises a substrate, a reflective layer from which a servo light used to control a data recording or reproducing position is reflected, the reflective transmission layer from which the irradiated signal light is reflected, and a recording layer on which the data is recorded;

the reflective transmission layer is adjacent to the recording layer and is closer to a portion of the recording layer on which the irradiated reference light is incident than the reflective layer;

the servo light is transmitted through the reflective transmission layer; and the signal light is reflected from the reflective transmission layer.

22. The apparatus as claimed in claim 13, wherein the controller controls the moving of the second focus by changing an amplitude of a driving signal.

23. The apparatus as claimed in claim 22, wherein the controller changes the amplitude of the driving signal until the controller detects that the generated focus error signal enters a negative feedback linear region.

24. The apparatus as claimed in claim 15, wherein:

the first focus error signal is a tracking error signal;

the second focus error signal is a tangential error signal; and the third focus error signal is a focus error signal.

25. A non-transitory computer readable recording medium encoded with instructions that, when read by at least one computer, causes the at least one computer to perform the method of claim 1.

* * * * *